United States Patent
Chau et al.

(10) Patent No.: US 9,152,580 B1
(45) Date of Patent: Oct. 6, 2015

(54) METHOD AND APPARATUS FOR TRANSFERRING DATA BETWEEN A HOST AND AN EMBEDDED DEVICE

(71) Applicant: MARVELL INTERNATIONAL LTD., Hamilton (BM)

(72) Inventors: Benson Chau, Santa Clara, CA (US); Kanwal Preet Banga, San Jose, CA (US); Frank Huang, Pleasanton, CA (US); Xiaohua Luo, San Jose, CA (US); Ken Yeung, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 471 days.

(21) Appl. No.: 13/648,459

(22) Filed: Oct. 10, 2012

Related U.S. Application Data

(60) Provisional application No. 61/552,416, filed on Oct. 27, 2011.

(51) Int. Cl.
  *G06F 13/14* (2006.01)
  *G06F 13/00* (2006.01)

(52) U.S. Cl.
  CPC ........................... *G06F 13/00* (2013.01)

(58) Field of Classification Search
  CPC ..... G06F 13/14; G06F 13/00; G06F 2003/00; H04L 12/00
  USPC ................................ 710/36–43; 370/389, 412
  See application file for complete search history.

(56) References Cited

U.S. PATENT DOCUMENTS

| | | | |
|---|---|---|---|
| 5,303,347 A * | 4/1994 | Gagne et al. ................... | 711/119 |
| 5,602,995 A * | 2/1997 | Hendel et al. .................. | 711/209 |
| 5,940,392 A * | 8/1999 | Lo et al. ......................... | 370/392 |
| 6,094,435 A * | 7/2000 | Hoffman et al. ............... | 370/414 |
| 6,457,059 B1 * | 9/2002 | Kobayashi ..................... | 709/242 |
| 6,584,517 B1 * | 6/2003 | Raza ............................... | 710/52 |
| 7,372,324 B2 * | 5/2008 | Kanoh ........................... | 330/10 |
| 7,720,112 B2 * | 5/2010 | Morris .......................... | 370/535 |
| 7,796,629 B1 * | 9/2010 | MacAdam et al. ............ | 370/422 |
| 7,974,278 B1 * | 7/2011 | Macadam et al. ............. | 370/389 |
| 8,005,971 B2 * | 8/2011 | Walls et al. .................... | 709/230 |
| 8,271,716 B2 * | 9/2012 | Srinivasan ..................... | 710/310 |
| 2006/0098648 A1 * | 5/2006 | Fukunaga et al. ............. | 370/389 |
| 2006/0176893 A1 * | 8/2006 | Ku et al. ........................ | 370/412 |
| 2011/0202696 A1 * | 8/2011 | Kitahara ......................... | 710/33 |
| 2012/0203945 A1 * | 8/2012 | Porterfield .................... | 710/107 |

* cited by examiner

Primary Examiner — Christopher Shin

(57) ABSTRACT

Methods, systems and computer program products are described for transferring aggregated data packets over an I/O interface from a host to a multiport embedded device. For example, a method includes receiving, by the device from the host, a single write command that (i) specifies two or more ports from among multiple ports of the device, and (ii) includes two or more data packets to be respectively written to the specified ports. The multiple ports of the device are mapped to corresponding locations of memory of the device. The method further includes saving, by the device in response to the single write command, the two or more data packets at two or more memory locations to which the specified ports are mapped. Additionally, the method includes sending, upon saving the data packets, a single notification to the host indicating that the device is ready to receive another write command.

26 Claims, 7 Drawing Sheets

METHOD AND APPARATUS FOR TRANSFERRING DATA BETWEEN A HOST AND AN EMBEDDED DEVICE

CROSS-REFERENCE TO RELATED APPLICATIONS

This disclosure claims priority to U.S. Provisional Application Ser. No. 61/552,416 titled "SDIO AGGREGATION FOR HIGH SPEED ACCESS," filed on Oct. 27, 2011, the disclosure of which is incorporated herein by reference in its entirety.

BACKGROUND

The subject matter of this disclosure is generally related to transfer of data over an input-output interface, for example to transfer of aggregated data packets between a host and a multiport embedded device.

Many electronic systems (also referred to as host systems) include embedded devices to control the operation of underlying system components and to provide enhanced functionality and operational flexibility. Examples of embedded devices are GPS receivers, modems, barcode readers, FM radio/TV tuners, RFID readers, digital cameras and interfaces to Wi-Fi or Ethernet networks. Input/output (I/O) functions between the host system and the embedded devices are sometimes provided via a secure digital input output (SDIO) interface.

In the case of an embedded device that provides network interface functionality, data flow between the host and the network is determined by throughput of both the I/O interface and the network interface of the embedded device. To avoid a potential bottleneck caused by the embedded device in this case, the throughput of the I/O interface should exceed (or at least match) the throughput of the network interface.

SUMMARY

Systems and techniques described in this specification can be used to transfer aggregated data packets over an I/O interface from a host to a multiport embedded device. For example, the host can issue a single command in accordance with the disclosed technologies to transfer multiple independent data packets to/from the multiport embedded device over the I/O interface. The data packets being sent to and received from the multiport embedded device can reside at multiple independent memory address locations on device-side memory. Data throughput via the I/O interface can be enhanced by aggregating N independent packets to be transferred with each write/read command issued by the host, and by confirming transfer of the N independent packets only at the end of the transfer.

One aspect of the subject matter described in this specification can be implemented in methods that include receiving, by interface hardware from a host, a single write command that (i) specifies two or more ports from among multiple ports of the interface hardware, and (ii) includes two or more data packets to be respectively written to the specified ports, such that the multiple ports of the interface hardware are mapped to corresponding locations of memory associated with the interface hardware; saving, by the interface hardware in response to the single write command, the two or more data packets at two or more memory locations to which the specified ports are mapped; and upon completion of said saving the two or more data packets, sending a single notification to the host indicating that the interface hardware is ready to receive another write command.

Implementations can include one or more of the following features. The single write command can further specify sizes of the two or more data packets to be respectively written to the specified ports. The interface hardware can be in communication with interface firmware, such that the interface firmware is configured to access data saved to the memory for further processing. As such, the method can further include sending a single notification to the interface firmware indicating that the two or more data packets are respectively saved at the two or more memory locations to which the specified ports are mapped.

In some implementations, the method can further include updating, by the interface hardware prior to sending the notification to the interface firmware, a download status record that identifies occupied ones from among the multiple ports of the interface hardware that are mapped to locations of the memory where data packets are currently saved, and unoccupied ones from among the multiple ports of the interface hardware that are mapped to other locations of the memory that are currently empty. In some implementations, the two or more ports specified by the single write command can include a first port, where a first data packet of the two or more data packets is to be written, and other ports, where the remaining ones of the two or more data packets are to be respectively written, such that the other ports are respectively specified relative the first port. In some cases, the other ports can be specified as a quantity of ports starting from the first port, such that the specified quantity of ports are respectively mapped to locations of the memory adjacent to the first memory location.

Another aspect of the present disclosure can be implemented as a non-transitory storage medium encoding instructions that, when executed by data processing apparatus, cause the data processing apparatus to perform operations including accessing an upload availability record associated with an interface device. The upload record indicates (i) occupied ones from among multiple ports of the interface device, where the multiple ports are respectively mapped to memory buffers associated with the interface device, such that a port is occupied if a data packet is currently saved in a memory buffer to which the port is mapped, and (ii) respective sizes of the memory buffers to which the multiple ports are respectively mapped; issuing, to the interface device, a single read command that specifies two or more of the occupied ports from where two or more data packets are to be respectively read; allocating a portion of memory associated with the data processing apparatus where the two or more data packets read by the interface device from the specified ports are to be saved; saving, to the allocated portion of the memory, the two or more data packets respectively read by the interface device from the specified ports in response to the single read command; and receiving, from the interface device, a single notification indicating that the interface device is ready for another read command.

Implementations can include one or more of the following features. A size of the allocated portion of the memory associated with the data processing apparatus can be a sum of sizes of ones, from among the memory buffers associated with the interface device, to which the specified ports are mapped. In some implementations, two or more ports specified by the single read command include a first port from where a first data packet of the two or more data packets is to be read, and other ports from where the remaining ones of the two or more data packets are to be respectively read, the other ports being respectively specified relative the first port. For example, the other ports are specified as a quantity of ports starting from the first port. As another example, the single read command further specifies a sum of sizes of ones, from among the memory buffers associated with the interface device, to which the specified ports are mapped, and the other ports are specified as ports starting from the first port, such that a sum of sizes of memory buffers to which the first port and the consecutive ports are mapped is equal to the specified sum.

Another aspect of the current disclosure can be implemented as a system including interface electronics configured to communicatively couple with a host; multiple memory buffers configured to save data to be uploaded to the host, and data downloaded from the host; and a controller coupled with the memory buffers. The controller is configured to access the data saved in the multiple buffers for further processing. The interface electronics are configured to perform download operations including receiving, from the host, a single download command that (i) references two or more of unoccupied memory buffers, and (ii) includes two or more data packets to be respectively downloaded at the referenced memory buffers, and saving, in response to the single download command, the two or more data packets at the referenced memory buffers, respectively. Further, the controller is configured to send, upon completion of the saving operation performed by the interface electronics, a single notification to the host indicating that the interface electronics are ready to receive another download command. The interface electronics are further configured to perform upload operations including receiving, from the host, a single upload command that references two or more of occupied memory buffers where data packets are respectively saved, and transmitting, to the host in response to the single upload command, the two or more data packets from the referenced memory buffers. Furthermore, the controller is configured to send, upon completion of the transmitting operation performed by the interface electronics, a single notification to the host indicating that the interface electronics are ready to receive another upload command.

Implementations can include one or more of the following features. The single download command can specify sizes of the two or more data packets to be respectively downloaded at the referenced memory buffers. In some implementations, the download operations can further include sending a single notification to the controller indicating that the two or more data packets can be accessed at the referenced memory buffers. The download operations can further include updating, prior to sending the single notification to the controller, a download status record that references (i) ones of the multiple memory buffers where data packets downloaded from the host are currently saved, and other ones of the multiple memory buffers that are unoccupied. The controller can be further configured to process given data packets downloaded from the host, clear memory buffers where the given data packets were saved prior to being processed, and update the download status record to indicate that the memory buffers where the given data packets were saved prior to being processed have been cleared.

In some implementations, the upload operations can further include sending a single notification to the controller indicating that the two or more data packets respectively read from the referenced memory buffers have been transmitted to the host. An upload availability record can indicate sizes of the multiple memory buffers, ones of the multiple memory buffers where data packets that have been transmitted to the host are currently saved, and other ones of the multiple memory buffers where other data packets that have not been transmitted to the host are currently saved. As such, the upload operations can further include updating the upload availability record prior to sending the notification to the controller. Further, the controller can be further configured to clear the referenced memory buffers from where the two or more data packets have been transmitted to the host, and to update, prior to sending the single notification to the host, the upload availability record to indicate that the referenced memory buffers have been cleared.

In some implementations, the interface electronics can include a predetermined quantity of ports that are respectively mapped to the multiple memory buffers. A first group of adjacent ones of the multiple memory buffers can have a first predefined size, and a second group of adjacent other ones of the multiple memory buffers can have a second predefined size larger than the first predefined size. Additionally, the first and second predefined buffer sizes can correspond to respective sizes of first and second types of data packets exchanged between the host and the interface electronics.

Further, the two or more unoccupied memory buffers can include (i) a first memory buffer where a first data packet of the two or more data packets is to be saved, the first memory buffer being referenced by specifying, in the single download command, a first port that is mapped to the first memory buffer, and (ii) other memory buffers where the remaining ones of the two or more data packets are to be respectively saved, the other memory buffers being referenced by respectively specifying, in the single download command, ports relative to the first port. In some cases, the other memory buffers can be adjacent to the first memory buffer and can be referenced by specifying, in the single download command, a quantity of ports starting from the first port.

Furthermore, the two or more occupied memory buffers can include (i) a first memory buffer from where a first data packet of the two or more data packets is to be uploaded, the first memory buffer being referenced by specifying, in the single upload command, a first port that is mapped to the first memory buffer, and (ii) other memory buffers from where the remaining ones of the two or more data packets are to be respectively uploaded, the other memory buffers being referenced by respectively specifying, in the single upload command, ports relative to the first port. In some cases, the other memory buffers are adjacent to the first memory buffer and are referenced by specifying, in the single upload command, a quantity of ports starting from the first port. In some other cases, the other memory buffers are adjacent to the first memory buffer and are referenced by specifying, in the single upload command, a sum of sizes of the two or more occupied memory buffers from where the two or more data packets are to be uploaded.

One or more of the following advantages can be realized. The described technologies allow the host to issue a single command to transfer multiple independent data packets to/from the multiport embedded device over the I/O interface. The disclosed single command sends to or receives from the multiport embedded device data packets which reside in multiple independent device-side memory address locations, unlike conventional commands that can transfer large blocks of data to/from the multiport embedded device only as a single packet which resides in contiguous address locations. This is due to an address field format used by the disclosed command, which specifies multiple independently addresses of the multiple data packets that are aggregated in a transferred packet, as opposed to an address field format available in conventional commands, which specifies a single address of the single transferred packet.

The systems and techniques described in this specification improve data throughput of the I/O interface. Only one confirmation interrupt ("download/upload ready") is sent by the multiport embedded device to the host after transferring an aggregated packet including N packets via a single write/read command, in accordance with the disclosed technologies. This eliminates the need to transmit N−1 such confirmation interrupts to the host, relative to a total of N interrupts that are transmitted to the host when transferring the N packets through N write/read commands, in accordance with conventional I/O interfaces (e.g., SDIO standard). Thus, the I/O interface used by embedded devices can be improved to match the growing demand for faster network interfaces.

In addition, the disclosed technologies improve data throughput of the device-bus. Only one handshake is provided by interface hardware of the multiport embedded device to controller firmware of the multiport embedded device after transferring an aggregated packet including N packets to the host via a single write/read command, in accordance with the disclosed technologies. This is N−1 fewer handshakes than a total of N handshakes that are provided to the controller firmware when transferring the N packets through N write/read commands, in accordance with conventional I/O interfaces (e.g., SDIO standard). Moreover, the systems and techniques described in this specification can lead to power savings for the multiport embedded device. By eliminating the N−1 handshakes and their related protocol overheads (from the physical layer to the network layer), active power reduction can be achieved in the overall embedded system. Even in cases where interface throughput can meet network throughput, better bus utilization using aggregate commands can allow for interface/bus/host power savings.

The systems and techniques disclosed in this specification enable the multiport embedded device to group the multiple ports based on sizes of the underlying buffers to which they are mapped. The buffer sizes can be pre-decided between the host and the multiport embedded device based on the sizes of the packets expected to be transferred through the I/O interface. This allows a small packet to be directed to a small buffer, and to avoid waste of a big buffer. For example, the multiport embedded device can communicate to the host that ports 0-3 are mapped to buffers of 256 bytes, whereas ports 4-7 are mapped to buffers of 2K. In this manner, the host transfers any small packets (less than 256 bytes) or commands to ports 0-3, whereas big packets (larger than 256 bytes) would be transferred to ports 4-7.

The disclosed technologies enable the multiport embedded device to aggregate a number of small packets (up to the number of the upload ports mapped to small buffers) in order to maximize the number of small packets uploaded using the disclosed read command. (Some large buffers could be reserved for high BW streams). Moreover, the systems and techniques described in this specification enable the multiport embedded device to support independent queues with programmable port assignments. In this manner, the same physical RF channel can be virtualized into multiple logical channels for different uses, e.g., for combining a station with a micro access point.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Technologies are described to transfer aggregated data packets over an I/O interface from a host to a multiport embedded device. For example, the host can issue a single command to transfer multiple independent data packets to/from the multiport embedded device over the I/O interface. The data packets being sent to and received from the multiport embedded device can reside at multiple independent memory address locations on device-side memory. Data throughput of the I/O interface is enhanced by aggregating multiple independent packets to be transferred with each write/read command issued by the host, and by confirming transfer of the multiple independent packets only at the end of the transfer.

Figure 1A:
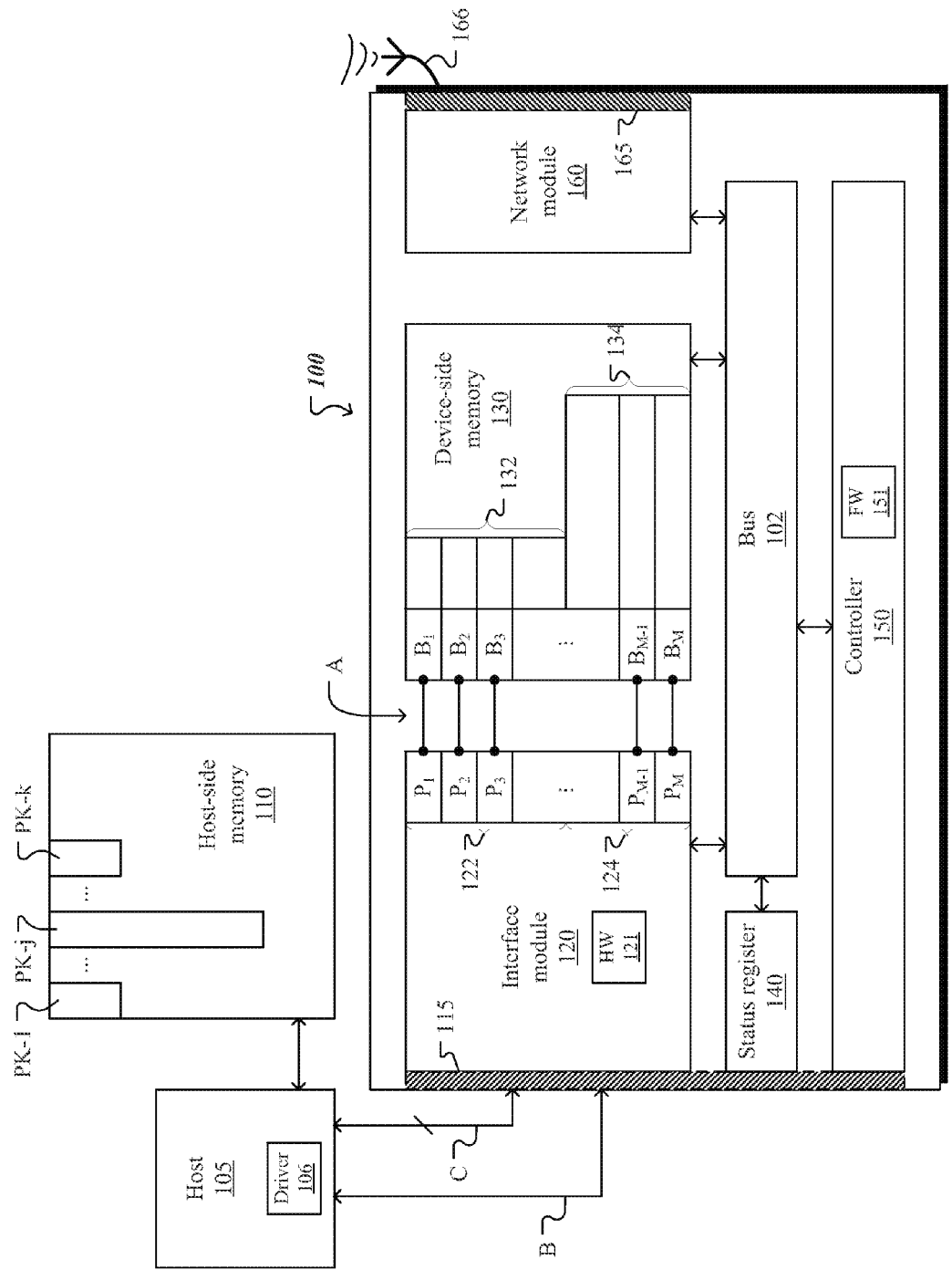
FIG. 1A shows an example of a system used to transfer aggregated data packets between a host and a multiport embedded device via an input-output interface.

FIG. 1A shows an example of a system used to transfer aggregated data packets between a host and multiport embedded device via an input-output interface. The system includes a host 105 in communication with an embedded device 100. The host 105 can be a smart phone, a tablet computer, a laptop, or the like. The host 105 can communicate with host-side memory 110, also referred to as memory associated with the host 110. The host-side memory 110 can include volatile (non-persistent) storage medium, non-volatile (persistent) storage medium, or a combination of both. The host 105 can include a driver 106 by which communications between the multiport embedded device 100 and the host 105 can be controlled.

In the example shown in FIG. 1A, the multiport embedded device 100 enables the host 105 to receive data from and transmit data to a network. In this example, the multiport embedded device 100 includes a network module 160, a controller 150, an interface module 120, and a device-side memory 130. These components of the multiport embedded device 100 are communicatively coupled to each other through a device bus 102. In other implementations, one or more of these components can reside outside of the multiport embedded device 100.

The network module 160 communicates with the network via a network interface 165. The network can be a wireless network, and in such case, the network module 160 can be implemented as a wireless chip that includes the wireless network interface 165. In some implementations, an antenna device 166 can be part of the wireless network interface 165. The controller 150 can relay data received from the network to the host 105 or data received from the host to the network via an input/output (I/O) interface 115 of the multiport embedded device 100. The controller 150 can be a general purpose microprocessor (e.g., a central processing unit—CPU) or a special purpose processor (e.g., a graphics processing unit—GPU), and includes firmware (FW) 151 by which operation of the multiport embedded device 100 can be controlled.

The firmware 151 can temporarily save to the device-side memory 130 (i) data received by the multiport embedded device 100 from the network prior to uploading the received data to the host 105, or (ii) data downloaded from the host 105 prior to transmitting the downloaded data to the network. In some cases, the controller 150 can preprocess the data saved in the device-side memory 130 (e.g., segment the data into data packets), or can process the temporarily saved data (e.g., parse content of the data for a particular characteristic), or can do both (e.g., segment the data into packets and retain only those packets that have the particular characteristic.) The device-side memory 130 can include volatile (non-persistent) storage medium, non-volatile (persistent) storage medium, or a combination of both. Memory address space of the device-side memory 130 can be logically partitioned into memory buffers, or simply buffers, $B_1, B_2, \ldots, B_M$. For example, there can be 16 memory buffers (M=16) in the device-side memory 130. As another example, there can be 32 memory buffers (M=32) in the device-side memory 130.

In some implementations, the memory buffers can be grouped in multiple groups of buffers, e.g., a group of first buffers 132, and a group of second buffers 134. The buffers of the first group 132 can have a common first size, e.g., 128 bytes, the buffers of the second group 134 can have a common second size, e.g., 2K. Note that the size of the memory buffers can be chosen to correspond to sizes of data packets commonly exchanged between the host 105 and the network. Such commonly exchanged data packets can be small data packets, e.g., 128 bytes or 256 bytes, or large data packets, e.g., 2K or 4K. In addition, the buffers of the first group 132 can correspond to adjacent addresses in a memory space of the device-side memory 130, e.g., $B_2$ neighbors $B_1$ and $B_3, \ldots, B_3$ neighbors $B_2$ and $B_4$, etc. In addition, the buffers of the second group 134 can correspond to other adjacent addresses in the memory space of the device-side memory 130, e.g., $B_{M-2}$ neighbors $B_{M-3}$ and $B_{M-1}$, $B_{M-1}$ neighbors $B_{M-2}$ and $B_M$, etc. Moreover, the memory buffers can be grouped as upload buffers, used to save data packets received from the network and uploaded to the host 105 from the multiport embedded device 100; and download buffers, used to save data packets downloaded by the host 105 to the multiport embedded device 100, prior to transmission to the network.

The interface module 120 includes interface hardware (HW) 121. The interface HW 121 is configured to manage the exchange of data packets between the driver 106 and the multiport embedded device 100, through the I/O interface 115. In some implementations, the I/O interface 115 can be based on the secure digital input/output (SDIO) standard. The I/O interface 115 includes a line "B" through which the driver 106 exchanges messages (e.g., interrupts) with the interface hardware 121 or with the controller firmware 151, and accesses a status register 140, for instance (other types of storage locations are also possible). In addition, the I/O interface 115 includes multiple lines "C" through which the driver 106 downloads (writes) data packets (e.g., $PK_1, PK_2, \ldots, PK_k$ stored in the host-side memory 110) to the interface hardware 121, or uploads (reads) data packets from the interface hardware 121 (and then stores the uploaded/read packets $PK_1$, $PK_2, \ldots, PK_k$ in the host-side memory 110.) The interface module 120 further includes a predetermined number of ports $P_1, P_2, \ldots, P_M$, such that each of the ports $P_j$ is mapped to a single memory buffer $B_j$ at a time, where j=1−M, and the number of ports M can be 16 or 32, for instance. In some implementations, the firmware 151 is configured to map consecutive ports, $P_j, P_{j+1}$, to buffers, $B_j, B_{j+1}$, which are adjacent in the memory space of the device-side memory 130.

The mapping between the ports $P_j$ of the interface device 120 to the buffers $B_j$ of the device-side memory 130 is accounted for in the status register 140. The status register 140 can be a register file including register entries corresponding to each of the pairs $(P_1, B_1), (P_2, B_2), \ldots$ Lines "A" that are used to map the ports $P_j$ of the interface device 120 to the buffers $B_j$ of the device-side memory 130 are dynamically configurable, such that the firmware 151 can re-allocate a new buffer $B_k$ (different from the currently mapped buffers $B_1, B_2, \ldots, B_M$) to a port $P_j$, if the data packet saved in the buffer $B_j$ (currently mapped to the port $P_j$) is scheduled for further processing by the controller 150. As part of the re-allocation, the firmware 151 updates the status register 140 by removing the $(P_j, B_j)$ register entry, and adding another $(P_j, B_k)$ register entry. Further, the entries of the status register 140 can indicate respective sizes of the memory buffers $B_1, B_2, \ldots, B_M$ of the device-side memory 130 to which the ports $P_1, P_2, \ldots, P_M$ of the interface module 120 are currently mapped. For example, a register entry $(P_j, B_j, 128)$ indicates that port $P_j$ is mapped to a 128-byte buffer $B_j$, and another register entry $(P_k, B_k, 2K)$ indicates that port $P_k$ is mapped to a 2K buffer $B_k$.

Additionally, the ports mapped to the first group of memory buffers 132 (e.g., the 128 byte-buffers) can be grouped together in a first group of ports 122, and the ports mapped to the second group of memory buffers 134 (e.g., the 2K-buffers) can be grouped together in a second group of ports 124. Moreover, the ports mapped to the upload buffers are referred to as upload ports, and the ports mapped to the download buffers are referred to as download ports. The status register 140 can include a download status record. The download status record identifies unoccupied download ports from among the download ports of the interface module 120. A download port $P_j$ is marked in download status record as unoccupied, if the download buffer $B_j$, to which the download port $P_j$ is mapped, is currently empty (e.g., no data packet downloaded from the driver 106 is currently saved in the download buffer $B_j$.) The unoccupied download port $P_j$ may be selected by the driver 106 as a port to which to write (download) a data packet. Conversely, a download port $P_k$ is marked in the download status record as occupied, if a data packet downloaded from the driver 106 is currently saved in the download buffer $B_k$. As it is already occupied, the download port $P_k$ may not be selected by the driver 106 as a port to which to write (download) another data packet. For example, the download status record at a given time can be represented by a bit map 10011101, which indicates that download port 1 (corresponding to the right-most digit) is unoccupied, and download port 2 (corresponding to the second right-most digit) is occupied. In this example, the download status record further indicates that download ports 3, 4, 5 and 8 also are unoccupied, and download ports 6 and 7 also are occupied.

Similarly, the status register 140 can include an upload availability record. The upload availability record identifies occupied upload ports from among the upload ports of the interface module 120. A port $P_j$ is marked in the upload availability record as occupied, if a data packet (e.g., received from the network) is currently saved in the buffer $B_j$ to which the port $P_j$ is mapped. The occupied upload port $P_j$ may be selected by the driver 106 as a port from which to read (upload) a data packet. Conversely, an upload port $P_k$ is marked in the upload availability record as unoccupied, if the buffer $B_k$, to which the port $P_k$ is mapped, is currently empty (e.g., no data packet received from the network is currently saved in the buffer $B_k$.) As it is unoccupied, the upload port $P_k$ may not be selected by the driver 106 as a port from which to read (upload) a data packet. For example, the upload availability record at a given time can be represented by a bit map 10011101, which indicates that upload ports 1, 3, 4, 5 and 8 are occupied, and download ports 2, 6 and 7 are empty.

The throughput of data exchanged by the host with the network is restricted by the throughput of the network interface 165 and the throughput of the I/O interface 115. To avoid a potential bottleneck caused by the multiport embedded device 100, the throughput of the I/O interface 115 should exceed (or at least match) the throughput of network interface 165. The technologies disclosed in this specification enable the multiport embedded device 100 to accomplish such performance by aggregating data packets exchanged between the host 105 and the multiport embedded device 100 through the I/O interface 115. Examples of using aggregate write/read commands in accordance with the disclosed technologies to write/read, by the host 105, multiple data packets to/from the multiport embedded device 100 are described below in connection with FIGS. 1A-1B. More specific aspects of writing/reading, by the driver 106, multiple data packets to/from respective multiple ports associated with the interface HW 121 are further described in connection with FIGS. 2-4.

For instance, the driver 106 can access a download status record in the status register 140 to select unoccupied download ports $P_{j+1}, P_{j+2}, \ldots, P_{j+k}$ of the interface module 120 to which the driver 106 would respectively download data packets $PK_1, PK_2, \ldots, PK_k$ (stored in the host-side memory 110). For example, these packets may be selected by the host 105 and downloaded to the multiport embedded device 100 for subsequent transmission to the network through the network interface 165. Once such port selection is performed, the driver 106 can issue, to the interface hardware 121 through the lines "C", a single write command that specifies the selected unoccupied download ports $P_{j+1}, P_{j+2}, \ldots, P_{j+k}$, and includes the data packets $PK_1, PK_2, \ldots, PK_k$ to be respectively written to the specified ports. In this manner, the single write command received by the interface HW 121 from the driver 106 (i) references the empty download buffers $B_{j+1}$, $B_{j+2}, \ldots, B_{j+k}$ to which the specified ports are mapped, and (ii) includes the data packets $PK_1, PK_2, \ldots, PK_k$ to be respectively saved in the referenced memory buffers. The single write command further specifies sizes of the data packets $PK_1, PK_2, \ldots, PK_k$ to be respectively written to the specified ports. In some implementations, packet size fields that respectively precede the data packets can be included in the single command. For example, the sequence 128, $PK_1$, 128, $PK_2, \ldots, 2K, PK_k$ indicates that each of packets $PK_1$ and $PK_2$, have a size of 128 bytes, and the packet $PK_k$ has a size of 2K. Such a single write command is referred to, interchangeably, as an aggregate write command.

The single aggregate write command can specify (i) a first download port $P_{j+1}$ of the interface module 120 where a first data packet $PK_1$ is to be written, and (ii) other download ports $P_{j+2}, \ldots, P_{j+k}$ where the remaining data packets $PK_2, \ldots, PK_k$ are to be respectively written, such that the other download ports $P_{j+2}, \ldots, P_{j+k}$ are respectively specified relative to the first download port $P_{j+1}$.

Figure 1B:
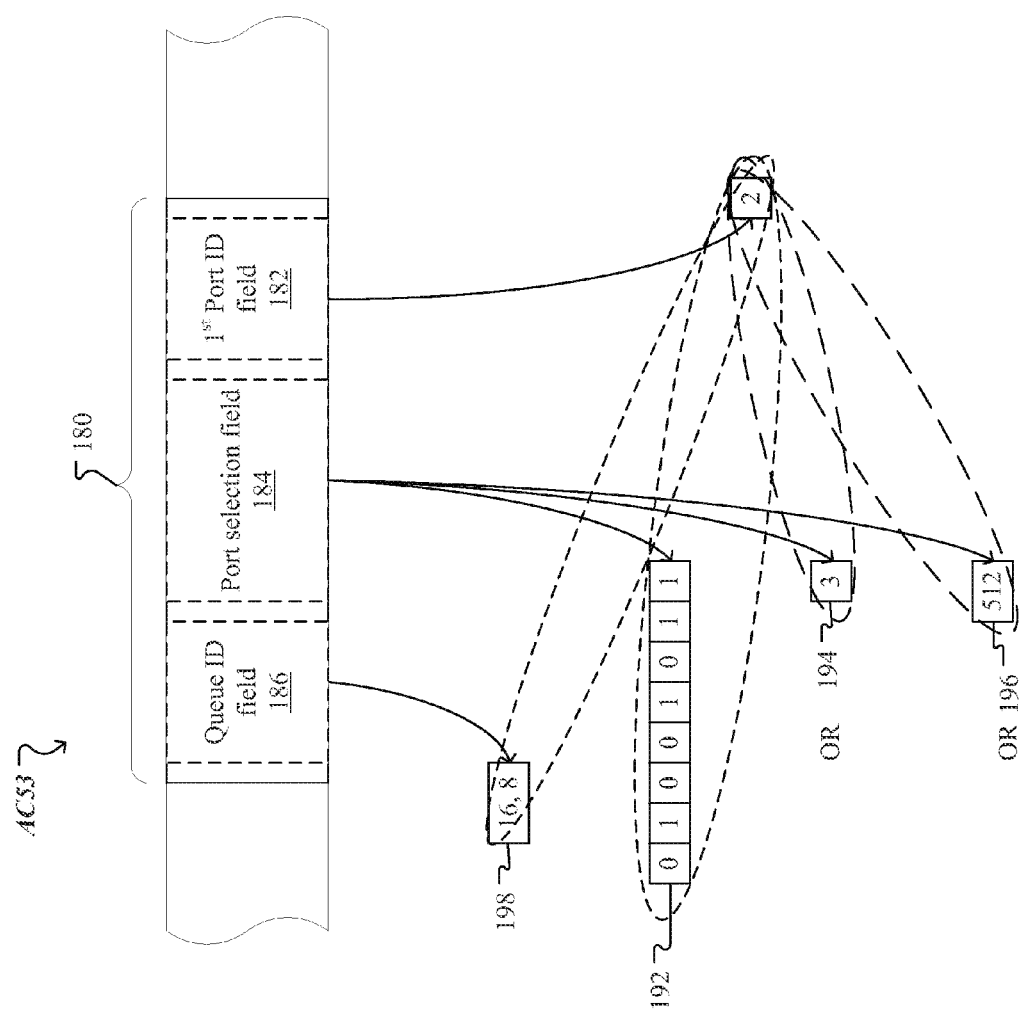
FIG. 1B shows aspects of a command issued over the input-output interface to transfer aggregated data packets between a host and a multiport embedded device.

FIG. 1B shows a few ways in which the other ports $P_{j+2}, \ldots, P_{j+k}$ can be specified relative to the first port $P_{j+1}$. An aggregate write (or read) command AC53 has an address field 180. Such address field can be conventionally used (e.g., as part of a CMD53 associated with the SDIO standard) to specify a single port to (from) which the interface HW 121 should write (read) a data packet. In the context of the technologies described in this specification, the address field 180 can include at least two other (sub-)fields. A first field 182 included in the address field 180 of the aggregate write (read) command AC53 can specify a first port to (from) which the interface HW 121 should write (read) the first data packet $PK_1$. This first field 182 is referred to as the $1^{st}$ port ID field 182. For example, if a value of the $1^{st}$ port ID field 182 is 2, the first data packet $PK_1$ is to be written to (read from) port $P_2$. A second field 184 included in the address field 180 of the aggregate write (read) command AC53 can specify, relative to the first port $P_{j+1}$, the other ports $P_{j+2}, \ldots, P_{j+k}$ to (from) which the interface HW 121 should write (read) the remaining data packets $PK_2, \ldots, PK_k$.

In some implementations applicable to aggregate write command AC53 and aggregate read command AC53, the port selection field 184 can be configured as a bitmap field 192. In the example illustrated in FIG. 1B, the $1^{st}$ port-ID field 182 has a value of 2, as described above. Additionally, the bitmap field 192 has a value 01001011, which specifies three other ports, 3, 5 and 8, counted relative to the port 2. In this case, the first (right-most) bit-1 corresponds to port 2; the next (second from right) bit-1 corresponds to specified port 3; the following bit-0 corresponds to skipped port 4; the next bit-1 corresponds to specified port 5, the next two bit-0s correspond to skipped ports 6 and 7; the next bit-1 corresponds to specified port 8; and the last bit-0 corresponds to skipped port 1.

In other implementations applicable to aggregate write command AC53 and aggregate read command AC53, the port selection field 184 can be configured as a port count field 194. A value of the port count field 194 specifies the other ports $P_{j+2}, \ldots, P_{j+k}$ as a quantity of ports that consecutively succeed the first port $P_{j+1}$. In the example illustrated in FIG. 1B, the $1^{st}$ port-ID field 182 has a value of 2, as described above. Additionally, the port count field 194 has a value of 3, which specifies three other ports, 3, 4 and 5 that consecutively succeed port 2.

In some other implementations, the address field 180 can include an additional (sub-) field 186 to support multiple queues. In this manner, the same physical RF channel can be virtualized into multiple logical channels for different uses (e.g., like micro access point mixed with a station.) The ports $P_1, P_2, \ldots, P_M$ of the interface module 120 can be logically grouped into N queues, where N=2, 4, etc., each of the N queues including an associated number of adjacent ports. In some implementations, the N queues can have different number of adjacent ports. In other implementations, a quantity M/N of buffers can be allocated to each of the N queues. For example, for M=16 and N=4, each of the queues has 16/4=4 buffers. The additional field 186 is referred to as the queue ID field 186.

A value of the queue ID field 198 for a given queue includes two parameters (start_idx, Q_prt_range), where the parameters specify an ID of the port starting the given, and a port range of the given queue, respectively. In the example illustrated in FIG. 1B, the queue ID field value 198 is (16, 8), which means that the queue referenced in the aggregate write (read) command AC53 starts at port 16 and has a range of 8 ports ($P_{16}, \ldots, P_{23}$.) When the queue ID field 186 is being used, e.g., to specify a given queue, as part of the aggregate write (read) command AC53, then the first port ID field 182 specifies a first port in the given queue to (from) which the interface HW 121 should write (read) the first data packet $PK_1$, and the port selection field 184 specifies the ports that are selected from among the ports of the given queue for writing (reading) the remaining packets $PK_2, \ldots, PK_k$.

Moreover, the M/N buffers in each queue can be linked together to form a circular buffer. In this case, the interface HW 121 is configured as a "wrap-around" port index. The interface HW has a set of registers that defines the "queue port range" of each queue (can be 2, 4, 8, 16, 32 in this example). For instance, the interface module 120 can support 4 independent queues with programmable port assignments. In this example, 32 ports are logically allocated to 4 queues. Ports in each queue are downloaded/uploaded circularly (e.g., port indices are wrapped around automatically within each queue). In this manner, the interface module 120 can receive the value of the Queue ID 198 from the aggregate write (read) command AC53 and can select one of the 4 queue port ranges from registers of the interface module 120 that is referenced in the command. Further in this example of aggregate write (read) command AC53, "start_idx" is a 5 bit parameter, and parameter "i" ranges from 0 to N−1 (for a total number of N ports in the queue.) The following logic can be used, in the current example, to wrap-around port indexes:

cur_idx=i+start_idx;

wrap_idx={start_idx[4:1],cur_idx[0]} for
    q_prt_range=2 ports;

wrap_idx={start_idx[4:2],cur_idx[1:0]} for
    q_prt_range=4 ports;

wrap_idx={start_idx[4:3],cur_idx[2:0]} for
    q_prt_range=8 ports;

wrap_idx={start_idx[4],cur_idx[3:0]} for
    q_prt_range=16 ports;

wrap_idx=cur_idx[4:0] for q_prt_range=32 ports.

As a first example, for parameter values q_prt_range=2 ports and start_idx=1, a port transfer index sequence for the aggregate write (read) command AC53 is 1, 0.

As a second example, for parameter values q_prt_range=2 ports, start_idx=15, a port transfer index sequence for the aggregate write (read) command AC53 is 15, 14.

As a third example, for parameter values q_prt_range=2 ports, start_idx=31, a port transfer index sequence for the aggregate write (read) command AC53 is 31, 30.

As a fourth example, for parameter values q_prt_range=4 ports, start_idx=2, a port transfer index sequence for the aggregate write (read) command AC53 is 2, 3, 0, 1.

As a fifth example, for parameter values q_prt_range=4 ports, start_idx=7, a port transfer index sequence for the aggregate write (read) command AC53 is 7, 4, 5, 6.

As a sixth example, for parameter values q_prt_range=4 ports, start_idx=17, a port transfer index sequence for the aggregate write (read) command AC53 is 17, 18, 19, 16.

As a seventh example, for parameter values q_prt_range=8 ports, start_idx=5, a port transfer index sequence for the aggregate write (read) command AC53 is 5, 6, 7, 0, 1, 2, 3, 4.

As an eight example, for parameter values q_prt_range=8 ports, start_idx=29, a port transfer index sequence for the aggregate write (read) command AC53 is 29, 30, 31, 24, 25, 26, 27, 28.

As a ninth example, for parameter values q_prt_range=8 ports, start_idx=18, a port transfer index sequence for the aggregate write (read) command AC53 is 18, 19, 20, 21, 22, 23, 16, 17.

As a tenth example, for parameter values q_prt_range=16 ports, start_idx=8, a port transfer index sequence for the aggregate write (read) command AC53 is 8, 9, 10, 11, 12, 14, 15, 0, 1, 2, 3, 4, 5, 6, 7.

As an eleventh example, for parameter values q_prt_range=16 ports, start_idx=29, a port transfer index sequence for the aggregate write (read) command AC53 is 29, 30, 31, 16, 17, 18, 19, 20, 21, 22, 23, 24, 25, 26, 27, 28.

As a twelfth example, for parameter values q_prt_range=32 ports, start_idx=29, a port transfer index sequence for the aggregate write (read) command AC53 is 29, 30, 31, 0-28.

Referring again to FIG. 1A, once the data packets $PK_1$, $PK_2$, ..., $PK_k$ included in the single aggregate write command are received at the interface module 120 from the driver 106 as part of the single aggregate write command, the interface HW 121 can parse the single aggregate write command to separate the individual packets, e.g., based on the packet size fields described above. The separated data packets $PK_1$, $PK_2$, ..., $PK_k$ are then saved to the download buffers $B_{j+1}$, $B_{j+2}$, ..., $B_{j+k}$ to which the specified ports are mapped. The interface HW 121 can update the download status record of the status register 140 to change a status of each of the download ports $P_{j+1}$, $P_{j+2}$, ..., $P_{j+k}$, to which the downloaded data packets $PK_1$, $PK_2$, ..., $PK_k$ have been written, from unoccupied to occupied. Additionally, the interface HW 121 can send a download-complete notification to the controller FW 151, e.g., via an interrupt.

Once saved in the download buffers $B_{j+1}$, $B_{j+2}$, ..., $B_{j+k}$ to which the specified ports are mapped, the downloaded data packets $PK_1$, $PK_2$, ..., $PK_k$ can (optionally be processed by the controller 150, and then, the processed or the unprocessed data packets can) be transmitted to the network over the network interface 165. Moreover, the controller FW 151 can clear the buffers occupied by the already transmitted data packets upon determining that no additional processing by the multiport embedded device 100 is scheduled for these data packets. In such cases, the controller FW 151 can update the download status record in the status register 140 to indicate that one or more of the download buffers $B_{j+1}$, $B_{j+2}$, ..., $B_{j+k}$ corresponding to the specified ports have been cleared. In other cases, the controller FW 151 can determine that additional processing by the multiport embedded device 100 is scheduled for the data packets $PK_1$, $PK_2$, ..., $PK_k$ saved in the download buffers $B_{j+1}$, $B_{j+2}$, ..., $B_{j+k}$ to which the specified ports are mapped. In the latter cases, the controller FW 151 can assign one or more new memory buffers to one or more of the specified ports, and can reset the status register 140 to reflect the new assignment(s).

At this point, the controller FW 151 can send a download-ready notification, e.g., an interrupt, to the driver 106 via the I/O interface 115. Upon receipt of the download-ready notification from the controller FW 151, the driver 106 can re-access the updated (or reset) download status record in the status register 140 to select other unoccupied ports of the interface module 120 where additional data packets are to be written. The driver 106 can then request to write the additional data packets to the selected unoccupied ports by issuing, to the interface HW 121, another single aggregate write command.

An example of using aggregate read commands in accordance with the disclosed technologies to read, by the host 105, multiple data packets from the multiport embedded device 100 are now described. For instance, the driver 106 can access an upload availability record in the status register 140 to select occupied upload ports $P_{j+1}$, $P_{j+2}$, ..., $P_{j+k}$ of the interface module 120 from which the driver 106 would respectively upload data packets $PK_{j+1}$, $PK_{j+2}$, ..., $PK_{j+k}$ for subsequent processing by the host 105. Along with the upload port selection, the driver 106 can determine from the status register respective sizes of the upload buffers $B_{j+1}$, $B_{j+2}$, ..., $B_{j+k}$ to which the selected occupied upload ports $P_{j+1}$, $P_{j+2}$, ..., $P_{j+k}$ are mapped.

At this point, the driver 106 can allocate a portion of the host-side memory 110 where the host 105 would save the data packets read from the selected ports of the multiport embedded device 100 as data packets $PK_1, PK_2, \ldots, PK_k$. In some implementations, the size of the allocated portion of the host-side memory 110 is a sum of sizes of the upload buffers $B_{j+1}, B_{j+2}, \ldots, B_{j+k}$ to which the selected upload ports $P_{j+1}, P_{j+2}, \ldots, P_{j+k}$ are mapped. For example, the driver 106 can allocate a portion of 512 bytes from the host-side memory 110 to save four data packets to be read from four occupied upload ports of the interface module 120, when each of upload ports $P_1, P_2, \ldots, P_M$ are mapped to upload buffers $B_1, B_2, \ldots, B_M$ with a size of 128 bytes: 512=4×128. In some implementations, the portion allocated by the driver 106 can be a contiguous portion of memory space associated with the host-side memory 110.

In addition to the host-side memory allocation, the driver 106 can issue, to the interface hardware 121 through the lines "C", a single aggregate read command that specifies the selected upload ports $P_{j+1}, P_{j+2}, \ldots, P_{j+k}$ from where data packets are to be respectively read. In this manner, the single aggregate read command received by the interface HW 121 from the driver 106 references the upload buffers $B_{j+1}, B_{j+2}, \ldots, B_{j+k}$ where the data packets to be respectively uploaded to the host 105 are saved. The single aggregate read command can specify (i) a first upload port $P_{j+1}$ of the interface module 120 from where a first data packet $PK_{j+1}$ is to be read, and (ii) other upload ports $P_{j+2}, \ldots, P_{j+k}$ from where the remaining data packets $PK_{j+2}, \ldots, PK_{j+k}$ are to be respectively read, such that the other upload ports $P_{j+2}, \ldots, P_{j+k}$ are respectively specified relative to the first upload port $P_{j+1}$.

A couple of ways to specify the other (download or upload) ports $P_{j+2}, \ldots, P_{j+k}$ relative to the first (download or upload) port $P_{j+1}$ are described above in connection with FIG. 1B. For instance the other (download or upload) ports can be specified by configuring the port selection field 184 as a bitmap field 192, or as a port count field 194. In other implementations applicable to an aggregate read command AC53, the port selection field 184 can be configured as an aggregated buffer size field 196. A value of the aggregated buffer size field 196 specifies a sum of sizes of the memory buffers $B_{j+1}, B_{j+2}, \ldots, B_{j+k}$ to which the specified ports are mapped. For instance, the driver 106 can determine, by accessing the status register 140, that each of the upload memory buffers $B_1, B_2, \ldots, \ldots, B_M$ to which the upload ports $P_1, P_2, \ldots, P_M$ of the interface module 120 are mapped has a size of 128 bytes. In this case, in order to read four data packets from the upload ports 2, 3, 4 and 5 of the interface module 120, the driver 106 inputs a value of 2 in the $1^{st}$ port-ID field 182, and a value of 512 in the total buffer size field 196. The value of 512 of the total buffer size field 196 corresponds to the sum of 128 bytes (representing a size of memory buffer $B_2$ to which port 2 is mapped)+128 bytes (representing a size of memory buffer $B_3$ to which port 3 is mapped)+128 bytes (representing a size of memory buffer $B_4$ to which port 4 is mapped)+128 bytes (representing a size of memory buffer $B_5$ to which port 5 is mapped).

Referring again to FIG. 1A, the interface module 120 transmits to the driver 106 the data packets $PK_{j+1}, PK_{j+2}, \ldots, PK_{j+k}$, saved in the upload buffers $B_{j+1}, B_{j+2}, \ldots, B_{j+k}$ to which the specified ports are mapped. Once the driver 106 saves the data packets $PK_{j+1}, PK_{j+2}, \ldots, PK_{j+k}$ read from the specified upload ports $P_{j+1}, P_{j+2}, \ldots, P_{j+k}$ in the allocated portion of the host-side memory 110, e.g., as the data packets $PK_1, PK_2, \ldots, PK_k$, the host 105 can start processing the requested data, or can save it in host-side persistent memory for later processing.

In the meantime, the interface HW 121 can update the upload availability record of the status register 140 to change a status of each of the upload ports $P_{j+1}, P_{j+2}, \ldots, P_{j+k}$, from which the uploaded data packets $PK_{j+1}, PK_{j+2}, \ldots, PK_{j+k}$ have been read, from an upload port corresponding to a packet that has not been uploaded to the host 105 to an upload port corresponding to a data packet that has been uploaded to the host 105. Additionally, the interface HW 121 can send an upload-complete notification to the controller FW 151, e.g., via an interrupt.

Once the data packets $PK_{j+1}, PK_{j+2}, \ldots, PK_{j+k}$ saved in the upload buffers $B_{j+1}, B_{j+2}, \ldots, B_{j+k}$ to which the specified ports are mapped have been transmitted to the driver 106 by the interface HW 121, the controller FW 151 can determine that no additional processing by the multiport embedded device 100 is scheduled for these data packets. In such cases, the uploaded data packets can be cleared from the upload buffers $B_{j+1}, B_{j+2}, \ldots, B_{j+k}$ by the controller FW 151. In addition, the controller FW 151 can update the upload availability record in the status register 140 to indicate that one or more of the upload buffers $B_{j+1}, B_{j+2}, \ldots, B_{j+k}$ corresponding to the specified upload ports have been cleared. In other cases, the controller FW 151 can determine that additional processing by the multiport embedded device 100 is scheduled for the data packets $PK_{j+1}, PK_{j+2}, \ldots, PK_{j+k}$ saved in the upload buffers $B_{j+1}, B_{j+2}, \ldots, B_{j+k}$ to which the specified upload ports are mapped. In the latter cases, the controller FW 151 can assign one or more new upload buffers to one or more of the specified upload ports, and can reset the status register 140 to reflect the new assignment(s).

At this point, the controller FW 151 can send an upload-ready notification, e.g., an interrupt, to the driver 106 via the I/O interface 115. Upon receipt of the upload-ready notification from the controller FW 151, the driver 106 can re-access the updated (or reset) upload availability record in the status register 140 to select other occupied upload ports of the interface module 120 from where additional data packets are to be read. The driver 106 can then request to read the additional data packets from the selected unoccupied upload ports by issuing, to the interface HW 121, another single read command.

Figure 2:
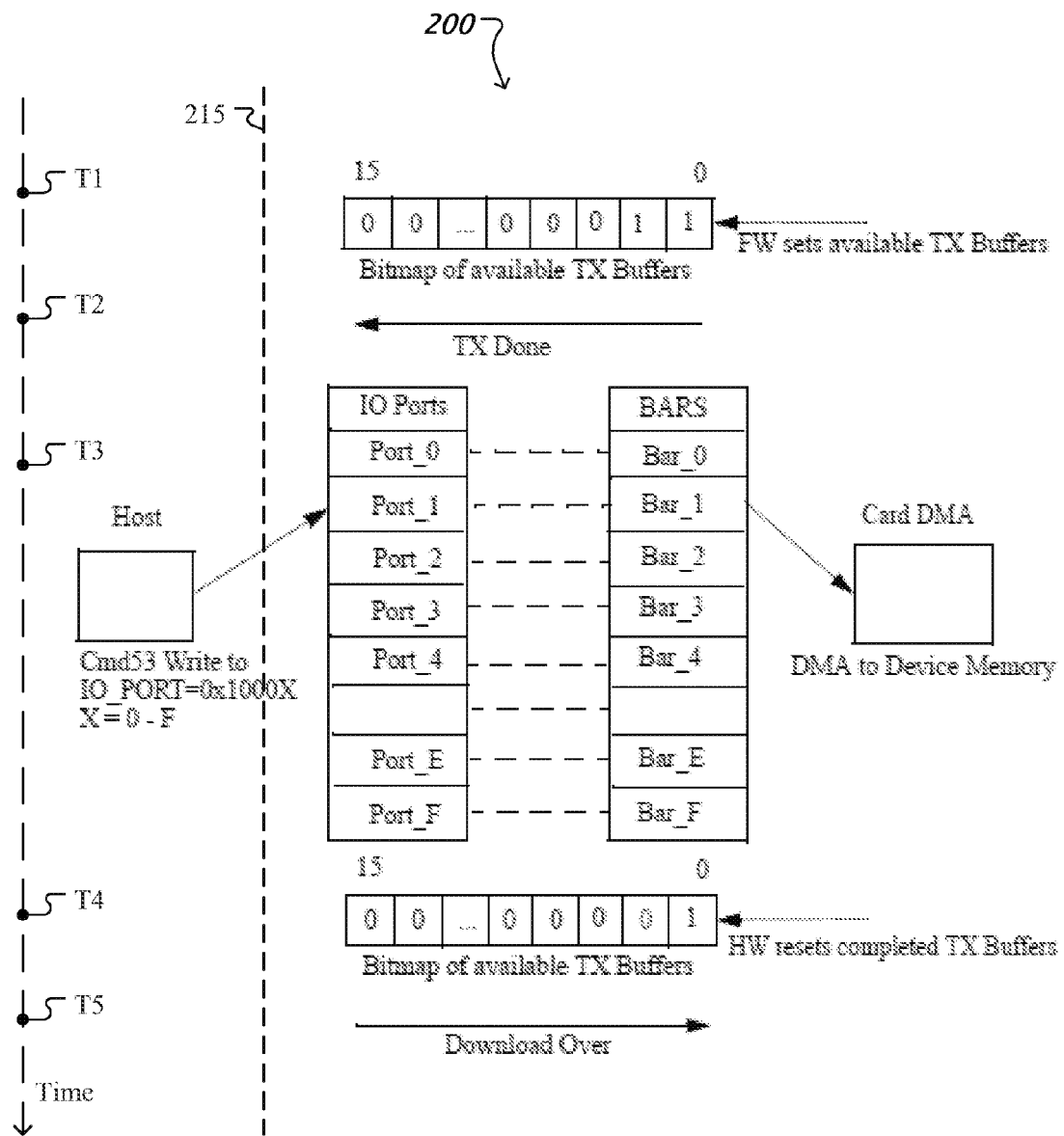
FIG. 2 shows aspects of downloading multiple data packets from a host to a multiport embedded device via an input-output interface.

FIG. 2 shows an example of a data flow 200 for downloading multiple data packets, in a sequential manner, from a host to a multiport embedded device via an input-output interface 215. The data flow 200 is also referred to as sequential download 200. A write command issued by the host through the interface 215 can be a CMD53 write in accordance with the SDIO standard. The sequential download 200 can be implemented, for example, in the system described above in connection with FIGS. 1A-1B. As such, the I/O interface 215 can correspond to the I/O interface 115, the multiport embedded device corresponds to the multiport embedded device 100 (and, like the multiport embedded device 100, includes interface HW 121, and controller FW 151), and the host can correspond to the host 105 (and, like the host 105, includes a driver 106.) In addition, the multiport embedded device of the example illustrated in FIG. 2 includes device memory, which can be partitioned in TX (download) buffers.

In the example illustrated in FIG. 2, each IO port of the multiport embedded device is mapped to a base address (BAR) corresponding to a TX buffer. In this example, the multiport embedded device has 16 TX ports (in addition to 16 RX ports), and the availability of each TX port is indicated through a bitmap register, in which bits are set by controller FW of the multiport embedded device (before setting "TX Done"). Further in this example, the availability of each TX port (as indicated in the bitmap register) is cleared by the interface HW of the multiport embedded device on completion of corresponding CMD53. The time axis indicates a temporal order of operations of the sequential download 200, such that time increases from the top of the FIG. 2 to the bottom.

At a time $t=T_1$, the controller FW programs the addresses of the 16 TX buffers of the device memory into the TX BAR registers. For instance, Bar__0_reg=0xC0001000, Bar__1_reg=0xC0001800 are addresses of two unoccupied TX buffers of 16 TX buffers. In addition, the controller FW sets (initializes) corresponding IO port TX bitmap=0x3 to show that download ports 0 (Port__0) and 1 (Port__1) have been mapped to the two available TX buffers. The initialized IO port TX bitmap can be now accessed by the host.

At $t=T_2>T_1$, the controller FW sets "TX download ready" interrupt to signal the host that unoccupied TX buffers are available for data packets to be downloaded from the host to the multiport embedded device. The host driver receives the "TX download ready" interrupt and reads TX bitmap using a CMD53.

At $t=T_3>T_2$, the host driver downloads a data packet through CMD53 write to Port__0, and the interface HW saves (via a direct memory access (DMA) to the multiport embedded device memory) the downloaded data packet to the TX buffer to which the Port__0 is mapped. Optionally, the host driver can download a second packet to available Port__1, in a similar manner with the downloading of the first packet.

At $t=T_4>T_3$, the controller FW receives from the interface HW of the multiport embedded device an interrupt "TX download over" after completion of CMD53 to Port__0. Upon receipt of the interrupt, the controller FW reads the TX bitmap to get the buffer with download data for further processing. Moreover, the interface HW resets the TX bitmap to indicate that the TX buffer, to which the Port__1 is mapped and where the first downloaded packet is currently saved, is no longer free. In addition, the controller FW can reset the TX bitmap, e.g., once the TX buffer, to which the Port__1 is mapped, is free (after MAC TX).

The interface HW can delay, until $t=T_5>T_4$, notifying the controller FW (by setting the "TX download ready" interrupt) until the controller FW has multiple free buffers, provided that the host driver still has some unoccupied buffers for future downloads. By using such delay, the multiport embedded device can avoid interrupting the host driver after each CMD53 write.

While not illustrated in FIG. 2, a data flow for uploading multiple data packets, in a sequential manner, from the host to the multiport embedded device via the input-output interface 215 is described below. The latter data flow is also referred to as sequential upload. In this case, the device memory associated with the multiport embedded device can be partitioned in RX (upload) buffers. Each JO port of the multiport embedded device is mapped to a base address (BAR) corresponding to an RX buffer. In this example, the multiport embedded device has 16 RX ports (in addition to 16 TX ports), and the availability of each RX port is indicated through a bitmap register, in which bits are set by controller FW of the multiport embedded device (before setting "Upload Ready"). Further in this example, the availability of each RX port (as indicated in the bitmap register) is cleared by the interface HW of the multiport embedded device on completion of corresponding CMD53.

At $t=T_1$, the controller FW programs the RX buffer addresses into the RX BAR registers. For example, Bar__0_reg=0xC0008000, Len__0_reg=0x430; and Bar__1_reg=0xC0008800, Len__1_reg=0x64 are addresses and sizes of occupied RX buffers in device memory. In addition, the controller FW sets (initializes) corresponding JO port RX bitmap=0x3 to show that upload ports 0 (Port__0) and 1 (Port__1) have been mapped to the two available RX buffers. The initialized JO port RX bitmap can be now accessed by the host.

At $t=T_2>T_1$, the controller FW sets "RX upload ready" interrupt to signal to the host that RX buffers currently save data packets to be uploaded by the host from the multiport embedded device. The host driver receives the "RX upload ready" interrupt and reads RX bitmap and length registers using a CMD53.

At $t=T_3>T_2$, the host driver uploads a packet through CMD53 read from Port__0. In response to this command, the interface HW transmits to the host driver the data packet saved in the RX buffer to which the Port__0 is mapped. Optionally, the host driver can upload a $2^{nd}$ packet from Port__1, in a similar manner with the uploading of the first packet.

At $t=T_4>T_3$, the controller FW receives from the interface HW of the multiport embedded device an interrupt "RX upload over" after completion of CMD53 to Port__0. Upon receipt of the interrupt, the controller FW reads RX bitmap to determine which buffer was uploaded. Moreover, the interface HW resets the RX bitmap to indicate that the RX buffer, to which the Port__1 is mapped and from where the first packet was read, now holds a data packet that has been already uploaded to the host. In addition, the controller FW can reset the RX bitmap, e.g., once the RX packet is available.

The interface HW can delay, until $t=T_5>T_4$, notifying the controller FW (by setting the "RX upload ready" interrupt) until the controller FW has multiple packets, provided the host driver still has some occupied buffers pending for uploads. By using such delay, the controller FW can avoid interrupting the host driver after each CMD53 read.

Figure 3:
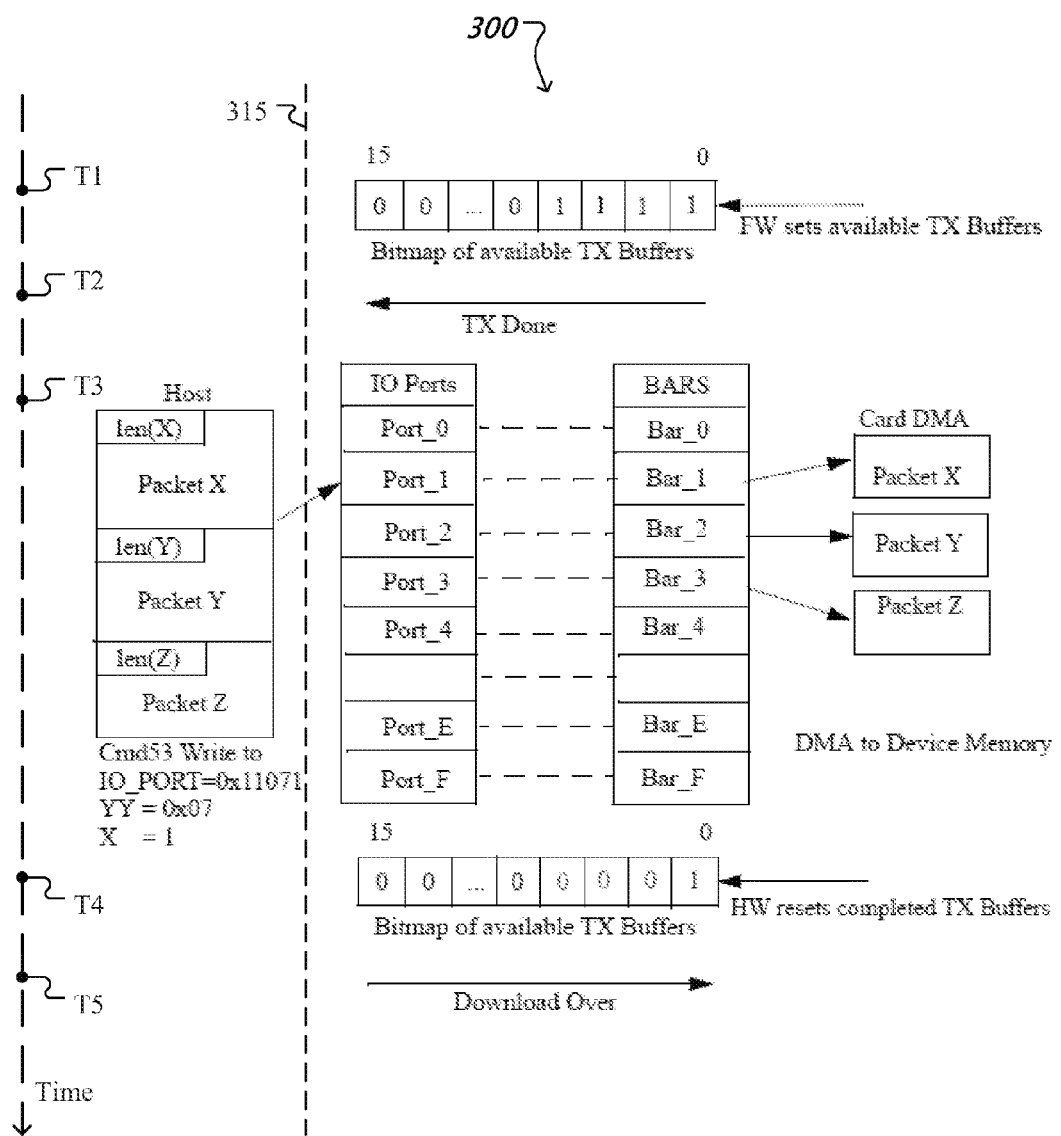
FIG. 3 shows other aspects of downloading aggregated data packets from a host to a multiport embedded device via an input-output interface.

FIG. 3 shows an example of a data flow 300 for downloading multiple data packets, in an aggregated manner, from a host to a multiport embedded device via an input-output interface 315. The data flow 300 is also referred to as aggregated download 300. A write command issued by the host through the interface 315 can be a CMD53 aggregate write in accordance with the aggregate command AC53 described above in connection with FIGS. 1A-1B. The aggregated download 300 can be implemented, for example, in the system described above in connection with FIGS. 1A-1B. As such, the I/O interface 315 can correspond to the I/O interface 115, the multiport embedded device corresponds to the multiport embedded device 100 (and, like the multiport embedded device 100, includes interface HW 121, and controller FW 151), and the host can correspond to the host 105 (and, like the host 105, includes a driver 106.) In addition, the multiport embedded device of the example illustrated in FIG. 3 includes device memory, which can be partitioned in TX (download) buffers.

In order to support aggregation of packets over the I/O interface 315, 16 TX buffers located at 16 BARs of the device memory are mapped to aggregate IO port map 0x11YYX (where YY=aggregate 8-bit bitmap to be used for current aggregate, X=start JO port number). Upon receipt from the host driver of a CMD53 aggregate write, the interface HW of the multiport embedded device parses the CMD53 aggregate write and splits the aggregated packet included in the CMD53 aggregate write into individual packets. The individual packets are then saved by the interface HW to the TX buffers (corresponding to BARs indicated in the bitmap field XX, starting from Port X). In this case, Port X corresponds to bit-0 of XX. This (bitmap) list of ports is treated as a circular list (wrap around Port F->Port__0).

In the example shown in FIG. 3, 0x110F3 corresponds to a start IO port=3, and transfer bitmap (rd/wr)=0F means that four protocol data units (PDUs) or data packets in the aggregated packet included in the CMD53 aggregate write need to be transferred to IO ports 3, 4, 5, 6. As another example, 0x110FE means that four PDUs in the aggregated packet included in the CMD53 aggregate write need to be transferred to IO ports E, F, 0, 1. The aggregated packet included in the CMD53 aggregate write can have the following aggregated packet format: {[PDU 0 length(2 bytes), PDU 0(N0 bytes), padding], [PDU 1 length(2 bytes), PDU 1(N1 bytes), padding], . . . , [PDU M length(2 bytes), PDU M(NM bytes), padding]}. For this format, each PDU [length, data, padding] starts and ends at a block boundary. In addition, PDU M length=NM+2 bytes. The order of packets downloaded is saved in a queue (DNLD_Q), which can be read in the SDIO register space of the multiport embedded device.

The time axis indicates a temporal order of operations of the aggregated download 300, where time increases from the top of FIG. 3 to the bottom.

At $t=T_1$, the controller FW programs the addresses of the 16 TX buffers of the device memory into the TX BAR registers. For instance, Bar_1_reg=0xC0001800; Bar_2_reg=0xC0002000; Bar_3_reg=0xC0002800 are addresses of three unoccupied ones of the 16 TX buffers. In addition, the controller FW sets (initializes) corresponding IO port TX bitmap=0x0E to show that TX Port_1, Port_2 and Port_3 have been mapped to three available TX buffers. The initialized JO port TX bitmap can now be accessed by the host driver.

At $t=T_2>T_1$, the controller FW sets "TX download ready" interrupt to signal to the host that TX buffers are available for data packets to be downloaded from the host to the multiport embedded device. The host driver receives the "TX download ready" interrupt and reads TX bitmap using a CMD53.

At $t=T_3>T_2$, the host driver downloads an aggregated packet through CMD53 aggregate write to Port_1, and the interface HW parses the aggregated packet included in the received CMD53 aggregate write. As described above, the aggregated packet has a simple format (e.g., 2 bytes of length followed by an individual packet, and so on), so the interface HW splits the aggregated packet into individual packets, and then saves (via DMA to the multiport embedded device memory) the individual packets to the buffers to which the Port_1, Port_2 and Port_3 are mapped. Optionally, the host driver can download a $2^{nd}$ aggregated packet based on a number of individual packets in the aggregate, and a number of available buffers in the device memory.

At $t=T_4>T_3$, the interface HW resets the TX bitmap to indicate that the TX buffers, to which the download Port_1, Port_2 and Port_3 are mapped and where the individual packets of the aggregated packet are currently saved, are no longer free.

At $t=T_5>T_4$, the controller FW receives from the interface HW an interrupt "TX download over" after completion of CMD53 aggregate write to Port_1. Upon receipt of the interrupt, the controller FW reads TX bitmap or the DNLD_Q registers to get the buffers with download data for further processing. In addition, the controller FW can reset the TX bitmap, e.g., once the TX buffers, to which the download Port_1, Port_2 and Port_3 are mapped, are free (after MAC TX).

Figure 4:
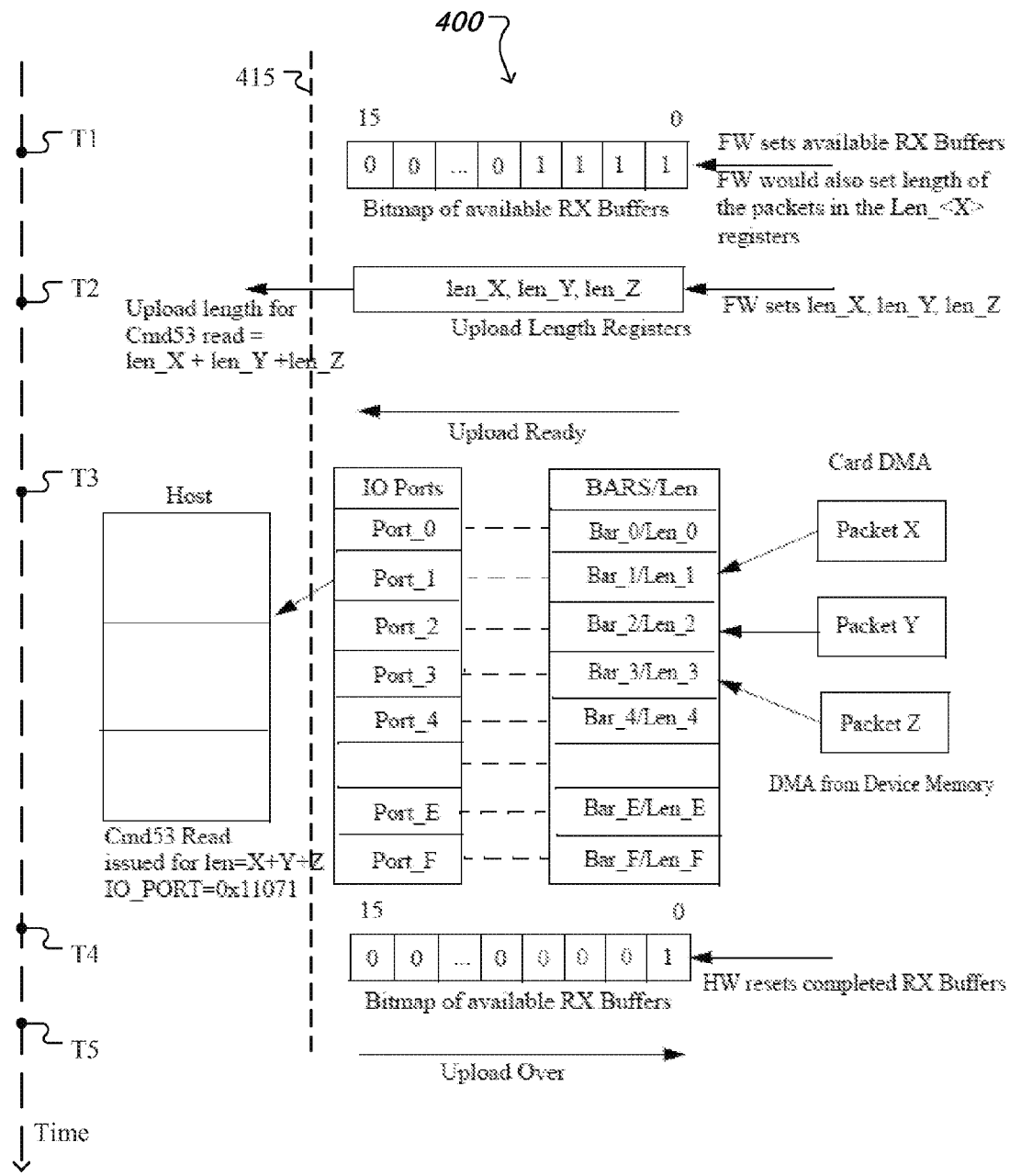
FIG. 4 shows aspects of uploading aggregated data packets to a host from a multiport embedded device via an input-output interface.

FIG. 4 shows an example of a data flow 400 for uploading multiple data packets, in an aggregated manner, to a host from a multiport embedded device via an input-output interface 415. The data flow 400 is also referred to as aggregated upload 400. A read command issued by the host through the interface 415 can be a CMD53 aggregate read in accordance with the aggregate read command AC53 described above in connection with FIGS. 1A-1B. The aggregated upload 400 can be implemented, for example, in the system described above in connection with FIGS. 1A-1B. As such, the I/O interface 415 can correspond to the I/O interface 115, the multiport embedded device corresponds to the multiport embedded device 100 (and, like the multiport embedded device 100, includes interface HW 121, and controller FW 151), and the host can correspond to the host 105 (and, like the host 105, includes a driver 106.) In addition, the multiport embedded device of the example illustrated in FIG. 4 includes device memory, which can be partitioned in RX (upload) buffers.

The aggregated upload 400 can be performed by the host in order to gather multiple data packets from corresponding RX Buffers of the device memory. The host driver can determine a size of host-side memory (e.g., expressed in number of blocks of host-side memory) to be allocated by the host in order to issue a CMD53 aggregate read. The size can be determined as a total of RD_Len_<X> registers corresponding to a bitmap of RX buffers to be used for CMD53 aggregate read. This size corresponds to a sum of the sizes of the RX buffers to be used for CMD53 aggregate read. Once the host driver issues the CMD53 aggregate read, the interface HW can retrieve the data packets saved in all target buffers referenced in the CMD53 aggregate read. In order to fit the read size referenced in the CMD53 aggregate read, the interface HW can pad the retrieved data packets with null data, if needed.

In the aggregated upload 400 shown in FIG. 4, an aggregated packet format is as follows: {[PDU 0(N0 bytes), padding], [PDU 1(N1 bytes), padding], . . . , [PDU M(NM bytes), padding]}. Each PDU [data, padding] is configured to start and end at a block boundary. In this manner, a length of each PDU is described in the corresponding RD_LENGTH register, and is equal to a size of an RX buffer where the PDU is saved. The order of packets uploaded is saved in a queue (UPLD_Q) which can be read in the SDIO register space.

The time axis indicates a temporal order of operations of the aggregated upload 400, where time increases from the top of FIG. 4 to the bottom.

At $t=T_1$, the controller FW programs the address of the 16 RX buffers of the device memory into the RX BAR registers, and lengths into Len_<X> registers. For instance, Bar_1_reg=0xC0007000, Len_1_reg=X; Bar_2_reg=0xC0007800, Len_2_reg=Y; Bar_3_reg=0xC0008000, Len_3_reg=Z, are addresses and lengths of three occupied ones of the 16 RX buffers. In addition, the controller FW sets (initializes) corresponding IO port RX bitmap=0xE to show that the upload Port_1, Port_2 and Port_3 have been mapped to three available RX buffers. The initialized IO port RX bitmap can now be accessed by the host driver.

At $t=T_2, >T_1$, the controller FW sets "RX upload ready" interrupt to signal to the host that data packets are currently available to be read by the host from some of the RX buffers of the multiport embedded device. The host driver receives the "RX upload ready" interrupt and reads RX bitmap and length registers. In this manner, the host driver selects Port_1, Port_2 and Port_3 that are mapped to the three available RX buffers, and allocates a portion of host-side memory corresponding to a total size of the three available RX buffers to which the selected ports are mapped.

At $t=T_3>T_2$, the host driver uploads an aggregated packet of length=(X+Y+Z) through CMD53 aggregate read from Port_1. In response to this command, the interface HW transmits to the host driver an aggregated data packet including the individual data packets saved in the three RX buffer to which Port_1, Port_2 and Port_3 are mapped.

At $t=T_4>T_3$, the interface HW resets the RX bitmap to indicate that data packets from the RX buffers, to which Port_1, Port_2 and Port_3 are mapped, have been already uploaded to the host.

At $t=T_5>T_4$, the controller FW receives from the interface HW an interrupt "RX upload over" after completion of CMD53 aggregate read from Port_1. Upon receipt of the interrupt, the controller FW reads RX bitmap or the UPLD_Q registers to determine which buffers were uploaded. In addition, the controller FW can reset the RX bitmap once the RX packet (MAC RX) is available.

Figure 5:
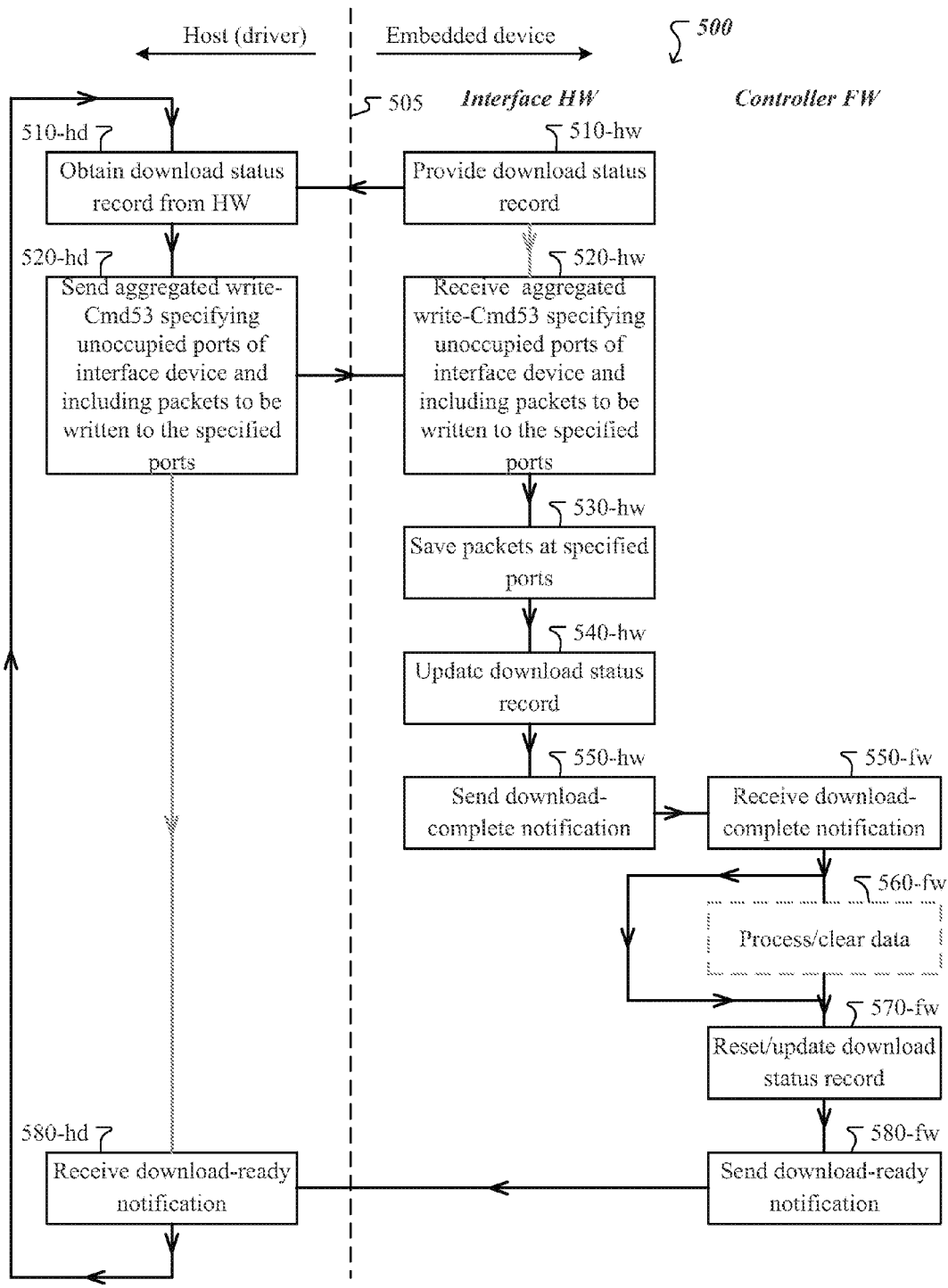
FIG. 5 is a flow chart showing an example of a process for downloading aggregated data packets from a host to a multiport embedded device.

FIG. 5 is a flow chart showing an example of a process 500 for downloading aggregated data packets from a host to a multiport embedded device. The host and the multiport embedded device can communicate via an I/O interface 505. The download process 500 can be implemented, for example, in the system described above in connection with FIGS. 1A-1B, such that the I/O interface 505 corresponds to the I/O interface 115. In analogy with the examples illustrated in FIG. 1A, the multiport embedded device includes interface HW and controller FW.

At 510, a download status record associated with the multiport embedded device is obtained by the host from the interface HW. The download status record, which was generated by the controller FW and was updated by either the interface HW or the controller FW, can indicate unoccupied ones from among multiple ports of the multiport embedded device. The ports of the multiport embedded device are mapped to respective memory buffers of the multiport embedded device. As described above in this specification, a port is occupied if a data packet is currently saved in a memory buffer to which the port is mapped, and the port is unoccupied if the memory buffer to which the port is mapped is currently empty. By accessing the download status record, the host can select two or more of the unoccupied ports of the multiport embedded device to which the host would respectively download data packets for subsequent processing by the multiport embedded device.

At 520, the host issues to the multiport embedded device a single write command (e.g., the aggregate write command described above in connection with FIGS. 1A-1B, or the Cmd53 aggregate write described above in connection with FIG. 3) that specifies two or more of the unoccupied ports, and includes two or more data packets to be respectively written to the specified ports. In this manner, the single write command received by the interface HW from the host (i) references two or more of empty memory buffers to which the specified ports are mapped, and (ii) includes the two or more data packets to be respectively downloaded at the referenced memory buffers. The single write command further specifies sizes of the two or more data packets to be respectively written to the specified ports. For example, packet size fields respectively precede the two or more data packets included in the aggregate write command described above in connection with FIGS. 1A and 3.

In some implementations, a single aggregate write command can specify (i) a first port of the multiport embedded device where a first data packet of the two or more data packets is to be written, and (ii) other ports of the multiport embedded device where the remaining ones of the two or more data packets are to be respectively written, such that the other ports are respectively specified relative to the first port. In the examples illustrated in FIGS. 1A-1B, a port-ID field of an aggregate write command can have a value of 2, which specifies port 2 as the first port where a first data packet of the two or more data packets is to be written. A port selection field of the aggregate write command can include a bitmap with a value 00110011, which specifies three other ports, 3, 6 and 7, counted relative to the port 2. In this case, the first (right-most) bit-1 corresponds to port 2; the next (second from right) bit-1 corresponds to specified port 3; the following two bit-0s correspond to skipped ports 4 and 5; the next two bit-1s correspond to specified ports 6 and 7, and the last two bit-0s correspond to skipped ports 8 and 1.

In other implementations, a single aggregate write command can specify (i) a first port of the multiport embedded device where a first data packet of the two or more data packets is to be written, and (ii) other ports of the multiport embedded device where the remaining ones of the two or more data packets are to be respectively written, such that the other ports are respectively specified as a quantity of ports that consecutively succeed the first port. In the examples illustrated FIGS. 1A-1B, a port-ID field of an aggregate write command can have a value of 4, and thus specifies port 4 as the first port where a first data packet of the two or more data packets is to be written. A port selection field of the aggregate write command can have a value of 3, which specifies three other ports, 5, 6 and 7 that consecutively succeed port 4.

At 530, the data packets downloaded from the host are written to the specified ports by the multiport embedded device. Once the two or more data packets included in the single write command are received from the host as part of the single write command, the interface HW can parse the single write command to separate the multiple packets from the aggregated packet included in the single write command, e.g., based on the packet size fields described above in connection with FIGS. 1A and 3. The separated data packets are then saved by the interface HW to the memory buffers to which the specified ports are mapped.

At 540, the download status record is updated by the interface HW. As part of the update, the status of the specified ports to which the two or more downloaded data packets have been written, at 530, is changed from "unoccupied" to "occupied".

At 550, a download-complete notification is sent by the interface HW to the controller FW. For example, the download-complete notification received by the controller FW can be an interrupt sent by the interface HW.

At 560, the downloaded data packets can be processed by the multiport embedded device (e.g., by the controller FW) in the buffers corresponding to the specified ports. Moreover, the controller FW can clear the buffers occupied by the already processed data packets upon determining that no additional processing by the multiport embedded device is scheduled for these data packets.

At 570, the download status record can be reset or updated by the controller FW. For example, the controller FW assigns a new memory buffer to one or more of the specified ports, and resets the download status record upon determining that additional processing by the controller FW is scheduled for the data packets saved thereof. In such case, 570 can be reached by skipping the clearing operation performed at 560. As another example, the controller FW updates the download status record to indicate that one or more of the memory buffers corresponding to the specified ports have been cleared at 560.

At 580, a download-ready notification is sent by the multiport embedded device to the host. For example, the download-ready notification received by the host driver can be an interrupt sent by the controller FW of the multiport embedded device.

Once the host driver receives the download-ready notification from the multiport embedded device, the host can re-access, at 510, the updated/reset download status record to select other unoccupied ports of the multiport embedded device where additional data packets are to be written. The host can then request to write the additional data packets to the selected unoccupied ports by issuing, to the multiport embedded device at 520, another single write command, e.g., another aggregate write command as described above in connection with FIGS. 1A-1B and 3.

Figure 6:
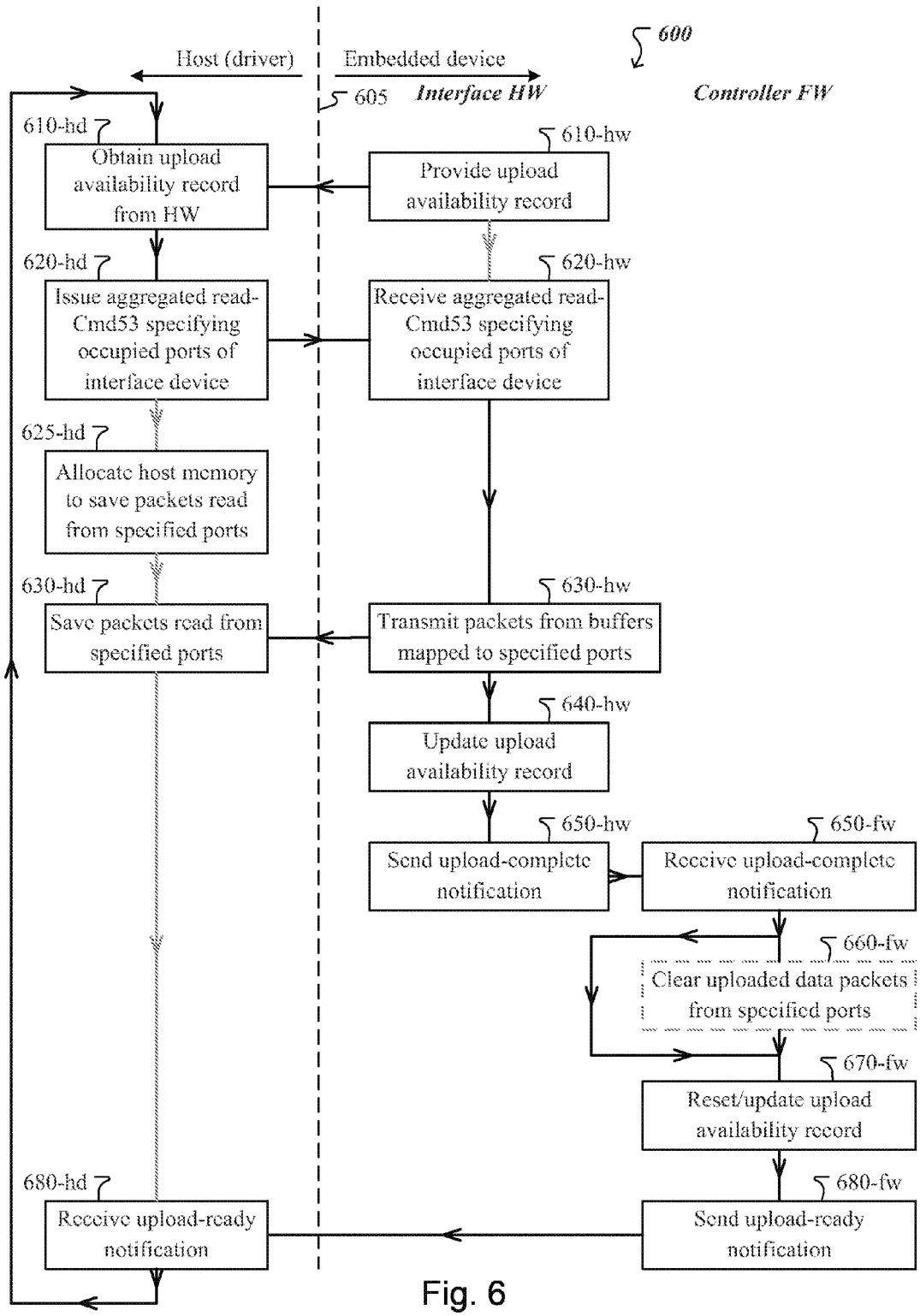
FIG. 6 is a flow chart showing an example of a process for uploading aggregated data packets to a host from a multiport embedded device.

FIG. 6 is a flow chart showing an example of a process 600 for uploading aggregated data packets to a host from a multiport embedded device. The host and the multiport embedded device can communicate via an I/O interface 605. The upload process 600 can be implemented, for example, in the system described above in connection with FIGS. 1A-1B, such that the I/O interface 605 corresponds to the I/O interface 115. In analogy with the examples illustrated in FIG. 1A, the multiport embedded device includes interface HW and controller FW.

At 610, an upload availability record associated with the multiport embedded device is obtained by the host from the interface HW. The upload availability record, which was generated by the controller FW and was updated by either the interface HW or by the controller FW, can indicate occupied ones from among multiple ports of the embedded device. The ports of the multiport embedded device are mapped to respective memory buffers of the multiport embedded device. As described above in this specification, a port is occupied if a data packet is currently saved in a memory buffer to which the port is mapped. In addition, the upload availability record can further indicate respective sizes of the memory buffers to which the multiple ports are respectively mapped. By accessing the upload availability record, the host can select which two or more data packets, from among the data packets available at the occupied ports of the multiport embedded device, would be uploaded to the host for subsequent processing.

At 620, the host issues to the multiport embedded device a single read command (e.g., the aggregate read command described above in connection with FIGS. 1A-1B and 4) that specifies two or more of the occupied ports from where two or more data packets are to be respectively read. In this manner, the single read command received by the interface HW from the host references two or more of occupied memory buffers where data packets are respectively saved.

In some implementations, a single aggregate read command can specify (i) a first port of the multiport embedded device from where a first data packet of the two or more data packets is to be read, and (ii) other ports of the multiport embedded device from where the remaining ones of the two or more data packets are to be respectively read, such that the other ports are respectively specified relative the first port. In the examples illustrated in FIGS. 1A-1B, a port-ID field of an aggregate read command can have a value of 2, which specifies port 2 as the first port from where a first data packet of the two or more data packets is to be read. A port selection field of the aggregate read command can include a bitmap with a value 00110011, which specifies three other ports, 3, 6 and 7, counted relative to the port 2. In this case, the first (right-most) bit-1 corresponds to port 2; the next (second from right) bit-1 corresponds to specified port 3; the following two bit-0s correspond to skipped ports 4 and 5; the next two bit-1s correspond to specified ports 6 and 7, and the last two bit-0s correspond to skipped ports 8 and 1.

In other implementations, a single aggregate read command can specify (i) a first port of the multiport embedded device from where a first data packet of the two or more data packets is to be read, and (ii) other ports of the multiport embedded device from where the remaining ones of the two or more data packets are to be respectively read, such that the other ports are respectively specified as a quantity of ports that consecutively succeed the first port. In the examples illustrated in FIGS. 1A-1B, a port-ID field of an aggregate read command can have a value of 4, and thus specifies port 4 as the first port from where a first data packet of the two or more data packets is to be read. A port selection field of the aggregate read command can have a value of 3, which specifies three other ports, 5, 6 and 7 that consecutively succeed port 4.

In some other implementations, a single aggregate read command can specify (i) a first port of the multiport embedded device from where a first data packet of the two or more data packets is to be read, (ii) other ports of the multiport embedded device from where the remaining ones of the two or more data packets are to be respectively read. In this case, the other ports are specified as ports that consecutively succeed the first port, such that a sum of sizes of memory buffers to which the first port and the consecutive ports are mapped is equal to the specified sum. In the examples illustrated FIGS. 1A-1B, a port-ID field of an aggregate read command can have a value of 3, and thus specifies port 3 as the first port from where a first data packet of the two or more data packets is to be read. A port selection field of the aggregate read command can have a value of 384, which specifies a sum of sizes of memory buffers to which ports that consecutively succeed port 3 are mapped. For instance, in this example, each of upload ports 1-8 is mapped to a memory buffer of size 128 bytes. In the foregoing example, the specified sum of 384 bytes=128 bytes (representing a size of a memory buffer to which port 3 is mapped)+128 bytes (representing a size of a memory buffer to which port 4 is mapped)+128 bytes (representing a size of a memory buffer to which port 5 is mapped). In this manner, the interface HW can determine that other specified ports, that consecutively succeed port 3, are ports 4 and 5.

At 625, a portion of host-side memory is allocated by the host. The allocated portion of the host-side memory can be used by the host to save the two or more data packets, read by the interface HW from the specified ports. In some implementations, the size of the allocated portion of the host-side memory is a sum of sizes of ones, from among the memory buffers associated with the multiport embedded device, to which the specified ports are mapped. For example, the host can allocate a portion of 384 bytes from the host-side memory to save 3 data packets read, at 620 using an aggregate read command, from ports 3, 4 and 5 of the multiport embedded device, when each of ports 1-8 of the multiport embedded device are mapped to memory buffers with a size of 128 bytes.

At 630, the data packets from the specified ports are transmitted by the interface HW to the host. Once the host driver saves the data packets read from the specified ports in the allocated portion of the host-side memory, the host can start processing the requested data, or can save it in host-side persistent memory for later processing.

At 640, the upload availability record is updated by the interface HW. As part of the update, the upload availability record is modified to indicate that the two or more data packets, read from the specified ports at 630, have been uploaded to the host.

At 650, an upload-complete notification is sent by the interface HW to the controller FW. For example, the upload-complete notification received by the controller FW can be an interrupt sent by the interface HW.

At 660, the uploaded data packets can be cleared by the controller FW from the buffers corresponding to the specified ports. For example, the controller FW can clear the buffers occupied by the already uploaded data packets upon determining that no additional processing by the multiport embedded device is scheduled for these data packets.

At 670, the upload availability record can be reset or updated by the controller FW. For example, the controller FW assigns a new memory buffer to one or more of the specified ports, and resets the upload availability record upon determining that additional processing by the controller FW is scheduled for the data packets saved thereof. In this case, 670 can be reached by skipping the clearing operation performed at 660. As another example, the controller FW updates the upload availability record to indicate that one or more of the memory buffers corresponding to the specified ports have been cleared at 660.

At 680, an upload-ready notification is sent by the multiport embedded device to the host. For example, the upload-ready notification received by the host driver can be an interrupt sent by the controller FW.

Once the host driver receives the upload-ready notification from the multiport embedded device, the host can re-access, at 610, the updated/reset upload availability record to select additional data packets from corresponding occupied ports of the multiport embedded device. The host can then request the selected additional data packets by issuing, to the multiport embedded device at 620, another single read command, e.g., another aggregate read command as described above in connection with FIGS. 1A-1B and 4.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
receiving, by interface hardware from a host, a single write command that (i) specifies two or more ports from among multiple ports of the interface hardware, and (ii) includes two or more data packets to be respectively written to the specified ports, wherein the multiple ports of the interface hardware are mapped to corresponding locations of memory associated with the interface hardware;
saving, by the interface hardware in response to the single write command, the two or more data packets at two or more memory locations to which the specified ports are mapped; and
upon completion of said saving the two or more data packets, sending a single notification to the host indicating that the interface hardware is ready to receive another write command.

2. The method of claim 1, wherein the single write command further specifies sizes of the two or more data packets to be respectively written to the specified ports.

3. The method of claim 1, wherein
the interface hardware is in communication with interface firmware, wherein the interface firmware is configured to access data saved to the memory for further processing, and
the method further comprises sending a single notification to the interface firmware indicating that the two or more data packets are respectively saved at the two or more memory locations to which the specified ports are mapped.

4. The method of claim 3, further comprising updating, by the interface hardware prior to said sending the notification to the interface firmware, a download status record that identifies occupied ones from among the multiple ports of the interface hardware that are mapped to locations of the memory where data packets are currently saved, and unoccupied ones from among the multiple ports of the interface hardware that are mapped to other locations of the memory that are currently empty.

5. The method of claim 1, wherein the two or more ports specified by the single write command comprise
  a first port, where a first data packet of the two or more data packets is to be written, and
  other ports, where the remaining ones of the two or more data packets are to be respectively written, such that the other ports are respectively specified relative the first port.

6. The method of claim 5, wherein the other ports are specified as a quantity of ports starting from the first port, such that the specified quantity of ports are respectively mapped to locations of the memory adjacent to the first memory location.

7. A non-transitory storage medium encoding instructions that, when executed by data processing apparatus, cause the data processing apparatus to perform operations comprising:
  accessing an upload availability record associated with an interface device, wherein the upload record indicates
    (i) occupied ones from among multiple ports of the interface device, wherein the multiple ports are respectively mapped to memory buffers associated with the interface device, such that a port is occupied if a data packet is currently saved in a memory buffer to which the port is mapped, and
    (ii) respective sizes of the memory buffers to which the multiple ports are respectively mapped;
  issuing, to the interface device, a single read command that specifies two or more of the occupied ports from where two or more data packets are to be respectively read;
  allocating a portion of memory associated with the data processing apparatus where the two or more data packets read by the interface device from the specified ports are to be saved;
  saving, to the allocated portion of the memory, the two or more data packets respectively read by the interface device from the specified ports in response to the single read command; and
  receiving, from the interface device, a single notification indicating that the interface device is ready for another read command.

8. The non-transitory storage medium of claim 7, wherein a size of the allocated portion of the memory associated with the data processing apparatus is a sum of sizes of ones, from among the memory buffers associated with the interface device, to which the specified ports are mapped.

9. The non-transitory storage medium of claim 7, wherein the two or more ports specified by the single read command comprise a first port from where a first data packet of the two or more data packets is to be read, and other ports from where the remaining ones of the two or more data packets are to be respectively read, the other ports being respectively specified relative the first port.

10. The non-transitory storage medium of claim 9, wherein the other ports are specified as a quantity of ports starting from the first port.

11. The non-transitory storage medium of claim 9, wherein the single read command further specifies a sum of sizes of ones, from among the memory buffers associated with the interface device, to which the specified ports are mapped, and
  the other ports are specified as ports starting from the first port, such that a sum of sizes of memory buffers to which the first port and the consecutive ports are mapped is equal to the specified sum.

12. A system comprising:
  interface electronics configured to communicatively couple with a host;
  multiple memory buffers configured to save data to be uploaded to the host, and data downloaded from the host; and
  a controller coupled with the memory buffers, wherein the controller is configured to access the data saved in the multiple buffers for further processing,
  wherein the interface electronics are configured to perform download operations comprising
    receiving, from the host, a single download command that (i) references two or more of unoccupied memory buffers, and (ii) includes two or more data packets to be respectively downloaded at the referenced memory buffers, and
    saving, in response to the single download command, the two or more data packets at the referenced memory buffers, respectively,
  wherein the controller is configured to send, upon completion of the saving operation performed by the interface electronics, a single notification to the host indicating that the interface electronics are ready to receive another download command,
  wherein the interface electronics are further configured to perform upload operations comprising
    receiving, from the host, a single upload command that references two or more of occupied memory buffers where data packets are respectively saved, and
    transmitting, to the host in response to the single upload command, the two or more data packets from the referenced memory buffers, and
  wherein the controller is further configured to send, upon completion of the transmitting operation performed by the interface electronics, a single notification to the host indicating that the interface electronics are ready to receive another upload command.

13. The system of claim 12, wherein the single download command specifies sizes of the two or more data packets to be respectively downloaded at the referenced memory buffers.

14. The system of claim 13, wherein the download operations further comprise sending a single notification to the controller indicating that the two or more data packets can be accessed at the referenced memory buffers.

15. The system of claim 14, wherein the download operations further comprise updating, prior to sending the single notification to the controller, a download status record that references (i) ones of the multiple memory buffers where data packets downloaded from the host are currently saved, and other ones of the multiple memory buffers that are unoccupied.

16. The system of claim 15, wherein the controller is further configured to
  process given data packets downloaded from the host,
  clear memory buffers where the given data packets were saved prior to being processed, and
  update the download status record to indicate that the memory buffers where the given data packets were saved prior to being processed have been cleared.

17. The system of claim 12, wherein the upload operations further comprise sending a single notification to the controller indicating that the two or more data packets respectively read from the referenced memory buffers have been transmitted to the host.

18. The system of claim 17, wherein
  an upload availability record indicates
    sizes of the multiple memory buffers, and
    ones of the multiple memory buffers where data packets that have been transmitted to the host are currently saved, and other ones of the multiple memory buffers where other data packets that have not been transmitted to the host are currently saved, and the upload operations further comprise updating the upload availability record prior to sending the notification to the controller.

19. The system of claim 18, wherein the controller is further configured to clear the referenced memory buffers from where the two or more data packets have been transmitted to the host, and update, prior to sending the single notification to the host, the upload availability record to indicate that the referenced memory buffers have been cleared.

20. The system of claim 12, wherein the interface electronics comprises a predetermined quantity of ports that are respectively mapped to the multiple memory buffers.

21. The system of claim 20, wherein a first group of adjacent ones of the multiple memory buffers have a first predefined size, and a second group of adjacent other ones of the multiple memory buffers have a second predefined size larger than the first predefined size, and the first and second predefined buffer sizes correspond to respective sizes of first and second types of data packets exchanged between the host and the interface electronics.

22. The system of claim 21, wherein the two or more unoccupied memory buffers comprise a first memory buffer where a first data packet of the two or more data packets is to be saved, the first memory buffer being referenced by specifying, in the single download command, a first port that is mapped to the first memory buffer, and other memory buffers where the remaining ones of the two or more data packets are to be respectively saved, the other memory buffers being referenced by respectively specifying, in the single download command, ports relative to the first port.

23. The system of claim 22, wherein the other memory buffers are adjacent to the first memory buffer and are referenced by specifying, in the single download command, a quantity of ports starting from the first port.

24. The system of claim 20, wherein the two or more occupied memory buffers comprise a first memory buffer from where a first data packet of the two or more data packets is to be uploaded, the first memory buffer being referenced by specifying, in the single upload command, a first port that is mapped to the first memory buffer, and other memory buffers from where the remaining ones of the two or more data packets are to be respectively uploaded, the other memory buffers being referenced by respectively specifying, in the single upload command, ports relative to the first port.

25. The system of claim 24, wherein the other memory buffers are adjacent to the first memory buffer and are referenced by specifying, in the single upload command, a quantity of ports starting from the first port.

26. The system of claim 24, wherein the other memory buffers are adjacent to the first memory buffer and are referenced by specifying, in the single upload command, a sum of sizes of the two or more occupied memory buffers from where the two or more data packets are to be uploaded.

* * * * *